United States Patent
Iwata et al.

(10) Patent No.: US 8,014,037 B2
(45) Date of Patent: Sep. 6, 2011

(54) FACSIMILE APPARATUS HAVING LARGE DISPLAY PANEL, OPERATION PANEL, AND DOCUMENT INSERT

(75) Inventors: Naohiro Iwata, Yokohama (JP); Hideaki Nagahara, Yokohama (JP); Akihiro Tomoda, Yokohama (JP); Kazuyuki Morinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 10/574,777

(22) PCT Filed: Oct. 15, 2004

(86) PCT No.: PCT/JP2004/015667
§ 371 (c)(1),
(2), (4) Date: Apr. 6, 2006

(87) PCT Pub. No.: WO2005/039169
PCT Pub. Date: Apr. 28, 2005

(65) Prior Publication Data
US 2007/0127079 A1 Jun. 7, 2007

(30) Foreign Application Priority Data
Oct. 20, 2003 (JP) ................................. 2003-359599

(51) Int. Cl.
*H04N 1/00* (2006.01)
*H04N 1/04* (2006.01)
*H04N 1/32* (2006.01)

(52) U.S. Cl. ......... 358/400; 358/474; 358/468; 358/498

(58) Field of Classification Search .................. 358/400, 358/498, 468, 1.18, 476, 496, 401, 505, 475; 345/594, 661, 168, 173, 1.2, 3.1, 5, 10, 11, 50

See application file for complete search history.

(56) References Cited

U.S. PATENT DOCUMENTS

| | | | | |
|---|---|---|---|---|
| 5,115,374 A | * | 5/1992 | Hongoh | 361/679.09 |
| 5,710,634 A | * | 1/1998 | Kuriyama et al. | 358/296 |
| 6,011,634 A | * | 1/2000 | Aihara et al. | 358/468 |
| 6,040,919 A | | 3/2000 | Iwata et al. | 358/400 |
| 6,246,493 B1 | * | 6/2001 | Uchiyama et al. | 358/498 |
| 6,426,803 B1 | | 7/2002 | Sasai et al. | 358/400 |
| 6,559,977 B2 | | 5/2003 | Sasai et al. | 358/400 |
| 2002/0190958 A1 | * | 12/2002 | Shimoosawa et al. | 345/172 |
| 2003/0059037 A1 | * | 3/2003 | Tsubai et al. | 379/428.01 |

* cited by examiner

*Primary Examiner* — Benny Tieu
*Assistant Examiner* — Ngon Nguyen
(74) *Attorney, Agent, or Firm* — Fitzpatrick, Cella, Harper & Scinto

(57) ABSTRACT

A facsimile apparatus in which a large display apparatus can be mounted while realizing miniaturization of an apparatus main body, an operation panel having excellent operability is realized, excellent inserting performance of documents and recording paper can be assured, compatibility between simple operability and multifunctional operability can be realized, is provided. The apparatus has: an operation panel 71 arranged in an upper front portion of the apparatus main body; a display unit 14 which is closably arranged to the operation panel 71, located in an upper rear position of the operation panel upon opening, and overlaid onto the operation panel upon closing; and a document inserting port 44 and a recording paper inserting port 29 arranged behind the operation panel in the upper portion of the apparatus main body and behind the display unit 14 upon opening.

8 Claims, 17 Drawing Sheets

FACSIMILE APPARATUS HAVING LARGE DISPLAY PANEL, OPERATION PANEL, AND DOCUMENT INSERT

TECHNICAL FIELD

The invention relates to a facsimile apparatus.

BACKGROUND ART

At present, facsimile apparatuses are also widespread in homes owing to miniaturization of a reading apparatus and a recording apparatus. FIG. 16 is a vertical sectional view of a center portion of a conventional facsimile apparatus. FIG. 17 is a plan view of an operation unit of the conventional facsimile apparatus. In the home-use facsimile apparatus, from the viewpoints of compactness of an apparatus main body, inserting performance of a document or recording paper, and operability of the ejected document or recording paper, as shown in FIG. 16, with respect to the document, generally, a document inserting port 201 is arranged in an upper portion of the main body and a document ejecting port 202 is arranged in a front position of the main body. With respect to the recording paper, generally, a recording paper inserting port 203 is arranged in the upper portion of the main body, a recording paper ejecting port 204 is arranged in the front position of the main body or both the recording paper inserting port and the recording paper ejecting port are arranged in the upper portion of the main body. That is, a construction in which both the document inserting port and the recording paper inserting port are arranged in the upper portion of the main body is often used. Also from a viewpoint of the operability, generally, an operation panel 205 is also is arranged in the upper front position of the main body as shown in FIG. 16 and the operation panel 205 is formed in a proper slant shape (inclined shape) by setting its front side to be lower than the rear side.

In the facsimile apparatus, various buttons such as numeral buttons, other buttons, and the like are arranged on the operation panel 205. In the home-use facsimile apparatus, for example, as shown in FIG. 17, in addition to a numeral button group 206, a number of buttons such as button group 207 concerning an auto answer-phone, button group 208 concerning a telephone directory, other functional button group 209, and the like are necessary. Therefore, in such a facsimile apparatus, compatibility of contradictory performance between the realization of the compactness of the apparatus main body by reducing a size of operation panel itself and the realization of a layout in which a number of buttons can be easily used is demanded.

Further, in recent years, a display unit having a large area for applications such as transmission and reception of E-mail, Web browsing, display to confirm a received image, and the like has been requested. For this purpose, the large display unit has to be arranged in addition to a number of buttons. It is more difficult to satisfy the compatibility between the compactness of the operation panel and the operability. To realize the compatibility between the compactness and the operability, for example, a construction in which an area where a number of buttons are arranged (layout) is assured by arranging the display unit 210 in a slightly upper position of the operation panel 205 as shown in FIG. 17 has been proposed.

However, in the facsimile apparatus, since a part of the document inserting port 201 and the recording paper inserting port 203 arranged behind the operation panel in the upper portion of the main body are hidden from the user by the display unit 210, there is such inconvenience that the operability upon inserting the document or the recording paper deteriorates. If the display unit 210 is arranged in the button layout area on the operation panel in order to improve the operability upon inserting the document or the recording paper, the area for arranging a number of buttons decreases, so that the operability of the buttons deteriorates. If the inserting operability of the document or the recording paper is improved by arranging the document inserting port 201 and the recording paper inserting port 203 so as to be sufficiently apart from the display unit 210, the compactness of the apparatus main body is lost.

DISCLOSURE OF THE INVENTION

It is an object of the invention to provide a facsimile apparatus in which a large display apparatus can be mounted while realizing miniaturization of an apparatus main body, an operation panel having an excellent operability is realized, and excellent inserting performance of documents and recording paper can be assured. Another object of the invention is to provide a facsimile apparatus in which compatibility between a simple operability and a multifunctional operability can be realized.

Still another object of the invention is to provide a facsimile apparatus comprising: an operation panel arranged in an upper front position of an apparatus main body; a display unit which is closably arranged to the operation panel, located in an upper and rear position of the operation panel upon opening, and overlaid onto the operation panel upon closing; a document inserting port, arranged in a rear position of the opened display unit of the upper portion of the apparatus main body, for inserting a document; and a recording paper inserting port, arranged in a rear position of the opened display unit of the upper portion of the apparatus main body, for inserting recording paper.

BEST MODES FOR CARRYING OUT THE INVENTION

Figure 1:
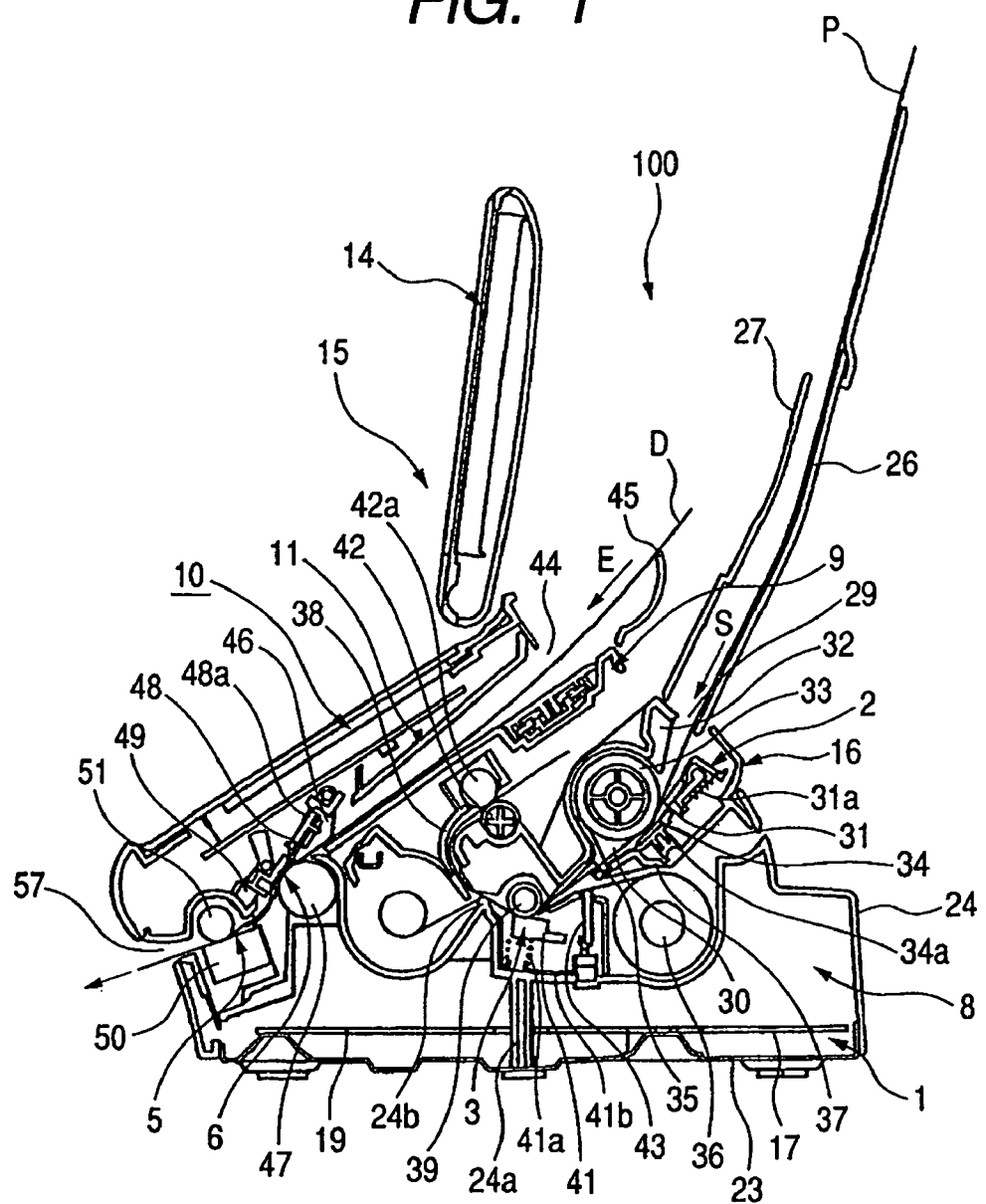
FIG. 1 is a vertical sectional view of a center portion showing a facsimile apparatus to which the invention is applied.
Figure 2:
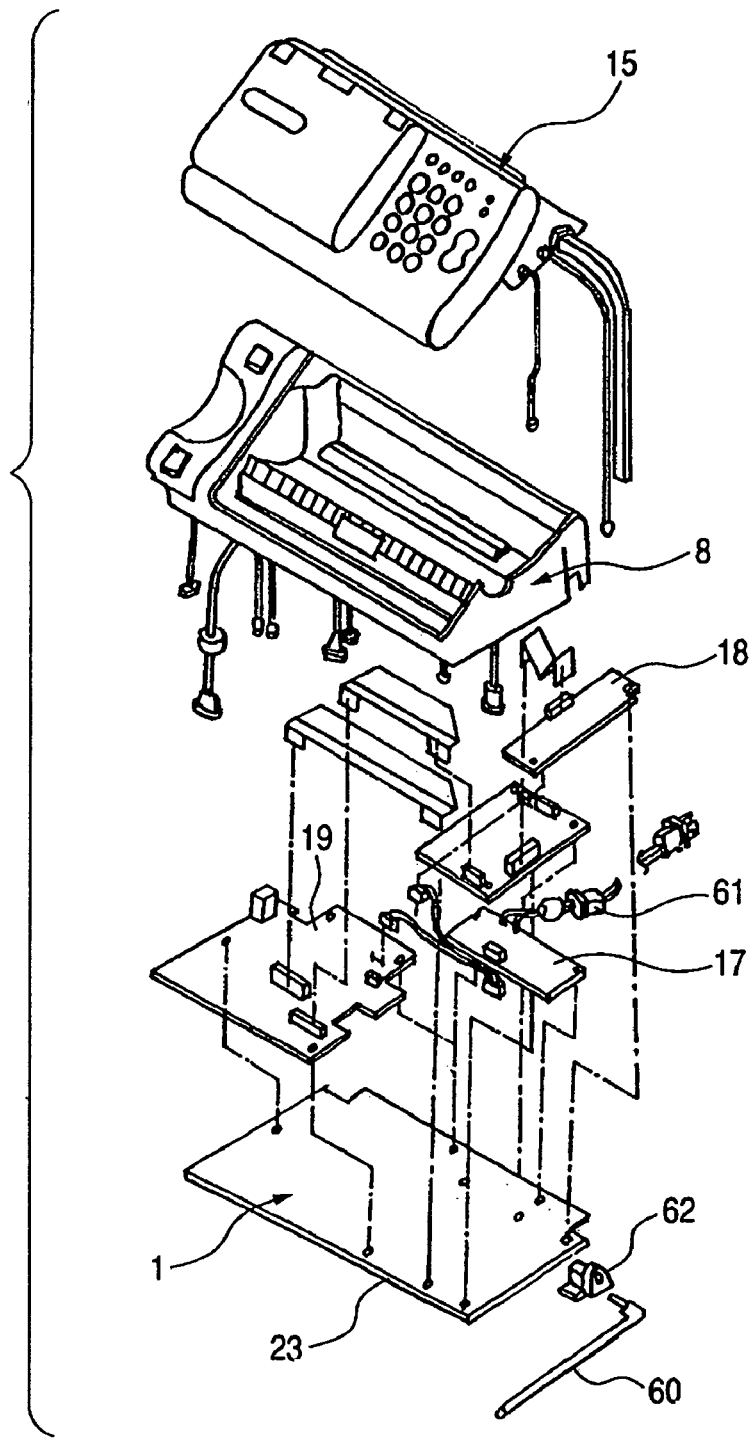
FIG. 2 is an exploded perspective view showing an electrical installing portion of the facsimile apparatus of FIG. 1.

An embodiment of the invention will be specifically described hereinbelow with reference to the drawings. The same or corresponding portions in all drawings are designated by the same reference numerals. FIG. 1 is a vertical sectional view of a center portion showing a facsimile apparatus to which the invention is applied. FIG. 2 is an exploded perspective view showing mainly an electrical installing portion of the facsimile apparatus of FIG. 1. In FIGS. 1 and 2, a facsimile apparatus 100 is constructed so as to read an image of a document and transmit it or receive image information and record an image onto recording paper. The facsimile apparatus 100 is also constructed so that it can read an image of a document and copy it onto recording paper. In place of the recording paper, various media such as thin medium made of plastics as a substitute of the recording paper, OHP sheet, sheet obtained by feeding and cutting a long sheet in a roll shaped, envelope, and the like can be also used as media to be recorded. In the embodiment, a thermal head is used as recording means and the operation for recording an image onto the recording paper is executed by transferring ink of an ink film.

A structure of the facsimile apparatus 100 will now be described with reference to FIGS. 1 and 2. In the facsimile apparatus shown in the drawings including FIG. 1, as for the right and left of the apparatus, when the user uses the apparatus, the left side in the case where he faces the apparatus is assumed to be the left side of the apparatus and the right side in the case where he faces the apparatus is likewise assumed to be the right side of the apparatus. When the user uses the apparatus, the front side of the apparatus in the case where the user faces the apparatus is assumed to be the front side of the apparatus and the rear side of the apparatus in the case where he faces the apparatus is likewise assumed to be the rear side of the apparatus.

First, an outline of the facsimile apparatus 100 will now be described from its lower portion. As shown in FIG. 1, a bottom plate unit 1 is arranged in a lowest portion of an apparatus main body 16. As shown in FIG. 2, the bottom plate unit 1 is constructed by a power source board 17, a board 18 for a cordless handset, a sub-control board 19, and the like. In FIG. 1, a lower cover 24 which functions as a frame of the apparatus main body 16 is arranged in an upper portion of the bottom plate unit 1. An upper cover unit 15 is provided in an upper portion of the lower cover 24 so as to be rotatable for a lower cover unit 8. Further, the upper cover unit 15 is constructed by a paper feed frame cover unit 9, an operation unit 10, and an ADF (Auto Document Feeder) frame unit 11. The paper feed frame cover unit 9 forms a part of an outer casing of the apparatus main body 16 and a guide on the lower side of a document conveying path. The ADF (Auto Document Feeder) frame unit 11 functions as an upper guide of the document conveying path. Buttons for operating the apparatus main body 16 and a display unit 14 showing a state of the apparatus are provided for the operation unit 10.

The paper feed frame cover unit 9 is provided with: an automatic paper feeding unit (hereinbelow, also referred to as an ASF (Auto Sheet Feeder) unit) 2 for separating and feeding recording paper P one by one; and a platen roller 39 of an image recording unit 3 for recording an image onto the recording paper P conveyed from the ASF unit 2. An automatic document feeding unit (hereinbelow, also referred to as an ADF (Auto Document Feeder) unit) 6 for separating and feeding documents D one by one is provided for the ADF frame unit 11. A thermal head 41 of the image recording unit 3 is attached to the portion of the lower cover unit 8 which faces the platen roller 39 of the image recording unit 3. A CIS (Contact Image Sensor) 50 and a CIS roller (reading white roller) 51 of a reading unit 5 for reading the document D conveyed from the ADF unit 6 are arranged in the portion of the lower cover unit 8 of a downstream of the ADF unit 6.

The upper cover unit 15 has the operation unit 10, the ADF frame unit 11, and the paper feed frame cover unit 9. The operation unit 10 and the ADF frame unit 11 are fixed with screws. The ADF frame unit 11 and the paper feed frame cover unit 9 are also fixed with screws. Therefore, the upper cover unit 15 is arranged so as to be rotatable for the lower cover unit 8. The operation unit 10, the ADF frame unit 11, and the paper feed frame cover unit 9 are simultaneously rotated.

Figure 10:
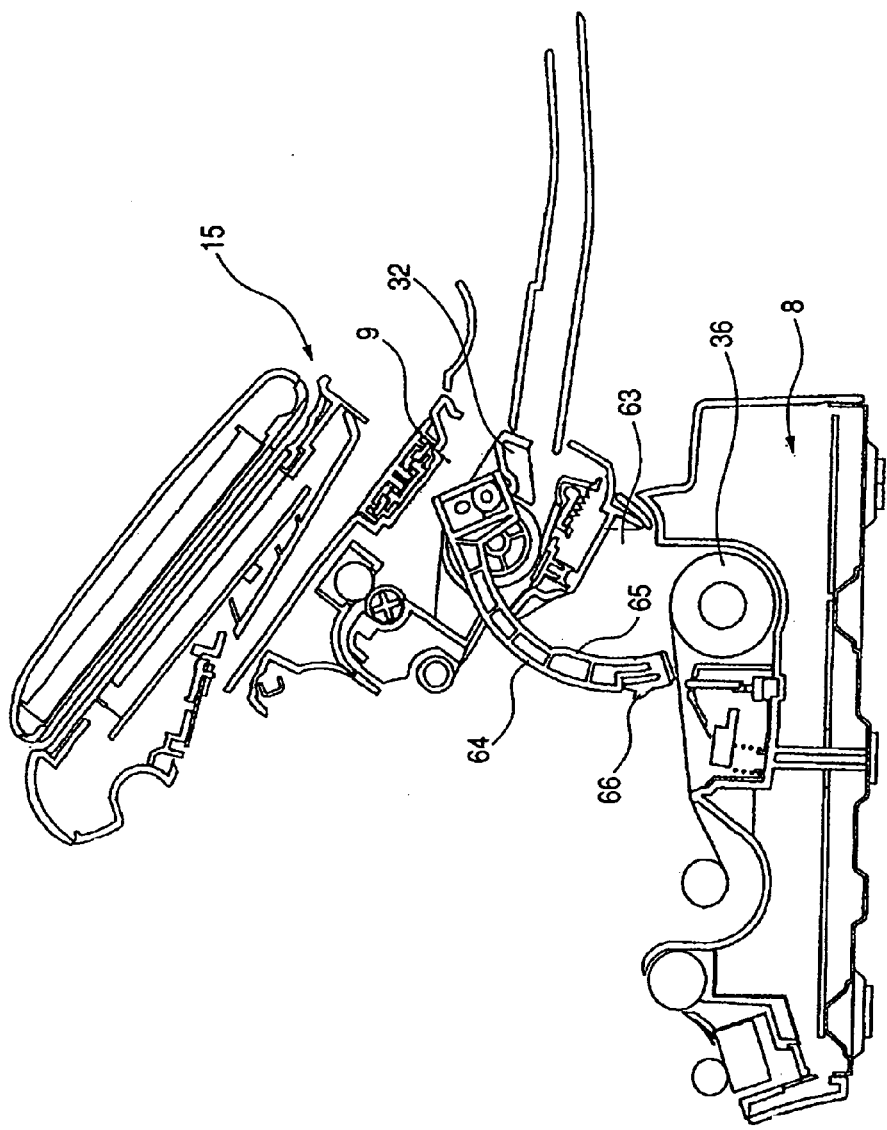
FIG. 10 is a vertical sectional view of the center portion showing a state when an upper cover unit is opened in the facsimile apparatus of FIG. 1.

FIG. 10 is a vertical sectional view of the center portion showing a state when the upper cover unit is opened in the facsimile apparatus of FIG. 1. The upper cover unit 15 is closably attached to the lower cover unit 8 as shown in FIG. 10. An opening angle of the upper cover unit 15 is adjusted to an angle (about 70°) at which exchange of an ink film cartridge 36 and the jam processing operation can be easily executed. An arc-shaped damper arm 64 in which a fulcrum 63 of rotation of the upper cover unit 15 is set to a center is attached to a paper feed frame 32 of the paper feed frame cover unit 9.

A projection 65 is formed on the damper arm 64. A damper rubber (not shown) to which a rotational load has been applied in one direction is attached to the apparatus main body 16 so as to be come into engagement with the projection 65. The damper arm 64 and the damper rubber operate in such a manner that they are pressed by the projection 65 and deformed, thereby applying a frictional load to the damper arm 64. The rotational load of the damper arm 64 and the damper rubber acts when the upper cover unit 15 is closed and functions as a damper when the upper cover unit 15 is closed. A stopper nail 66 is formed in a front edge portion of the damper arm 64. When the stopper nail 66 is come into engagement with a damper rubber holder (not shown) formed in the lower cover unit 8, it functions as a stopper for restricting the opening angle of the upper cover unit 15 to the foregoing adjusted angle (about 70°) or less.

Figure 6:
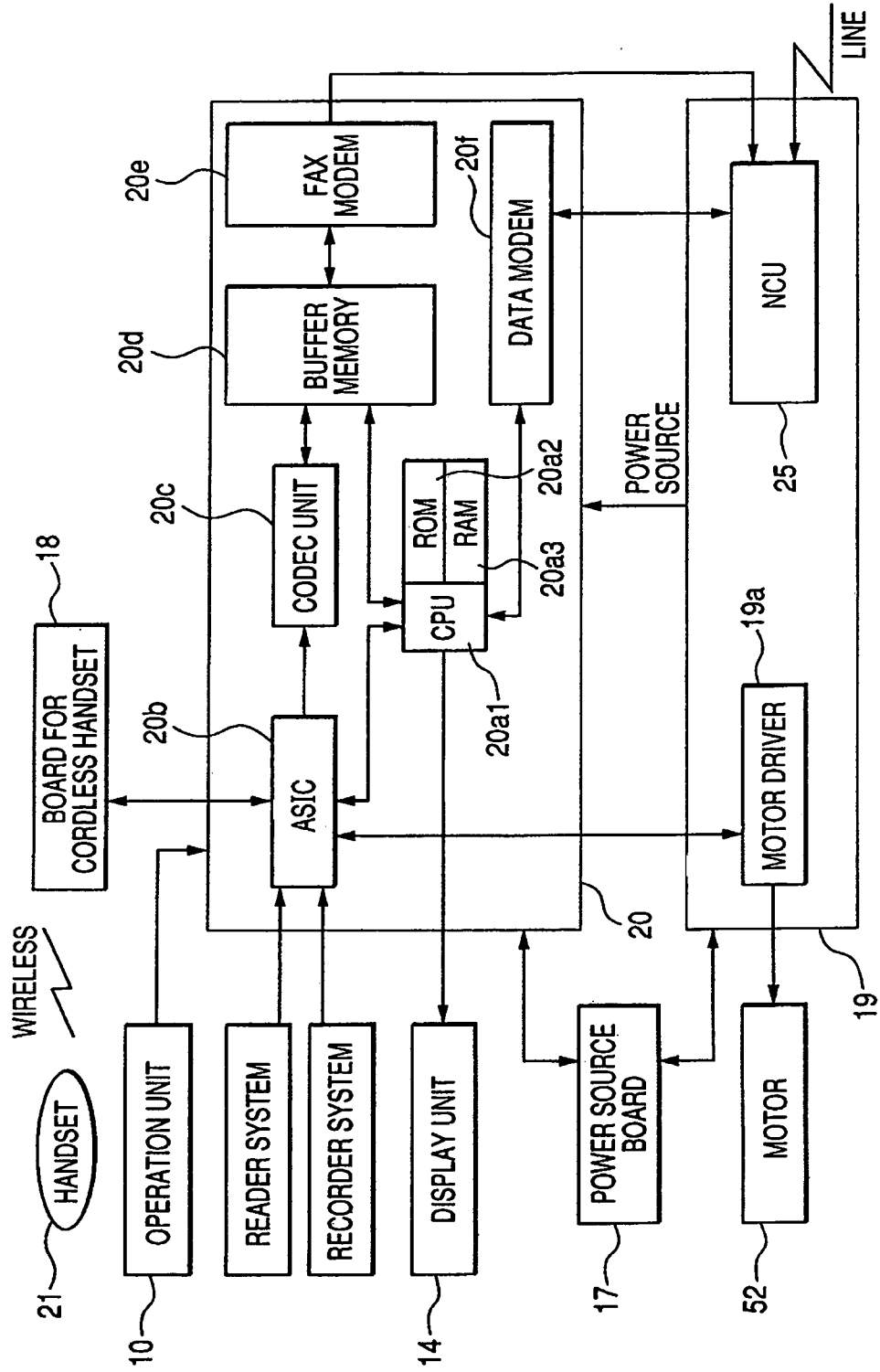
FIG. 6 is a block diagram showing a construction of a control system of the facsimile apparatus of FIG. 1.

FIG. 6 is a block diagram showing a construction of a control system of the facsimile apparatus of FIG. 1. The control system of the facsimile apparatus 100 will now be described with reference to FIG. 6. In FIG. 6, the control system is constructed by: a main control board 20 of the facsimile apparatus 100; the power source board 17 for supplying an electric power to the whole facsimile apparatus 100; the sub-control board 19 on which a circuit for driving a motor and controlling a sensor and a network control unit circuit (NCU circuit) 25 which is connected to a telephone line are mounted; the board 18 for the cordless handset; and the like.

The main control board 20 comprises: a CPU 20a1 for controlling the whole facsimile apparatus 100; a ROM 20a2 in which various programs, various data, and the like have been stored; a RAM 20a3 which is used as a work area of the CPU 20a1 and temporarily stores various data; a FAX modem 20e for modulating digital facsimile data into analog data and demodulating the analog data into the digital data; and the like. A data modem 20f as a modem for similarly executing modulation and demodulation for making data communication is also provided for the main control board 20. An ASIC 20b includes a line memory for storing an image of each line of the read-out image data. When the facsimile apparatus 100 executes the image reading operation upon transmission or copying, the ASIC 20b stores the image data of one line from the reading unit 5.

When the image data is received, the ASIC 20b stores the decoded image data of one line. The image data stored in the ASIC 20b including the line memory is converted into the image data of each line. By supplying the image data to the recording unit, it is recorded as an image onto the recording paper P. A codec unit (encoding/decoding unit) 20c encodes the image information to be transmitted by MH encoding or the like and decodes the received encoded image data, thereby converting it into the image data. A buffer memory 20d stores the encoded image data which was transmitted/received. Further, in the facsimile apparatus 100 in the embodiment, a cordless telephone can be used as a cordless handset. Therefore, the board 18 for the cordless handset of a base unit side and a cordless handset board (not shown) of a portable handset side in a handset 21 are connected in a wireless manner. A motor driver 19a for driving a motor has been mounted on the sub-control board 19. The motor driver 19a drives a motor 52 on the basis of a control signal from the ASIC 20b of the main control board 20. With respect to a power supply, a power source is supplied by electrically connecting the power source board 17 to the main control board 20 and the sub-control board 19.

Figure 4A:
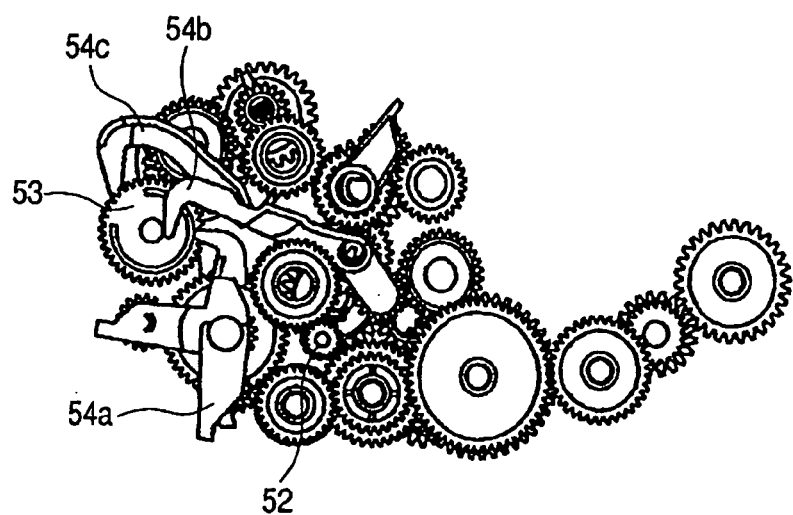
FIG. 4A is a side elevational view of a driving system of the facsimile apparatus of FIG. 1.
Figure 4B:
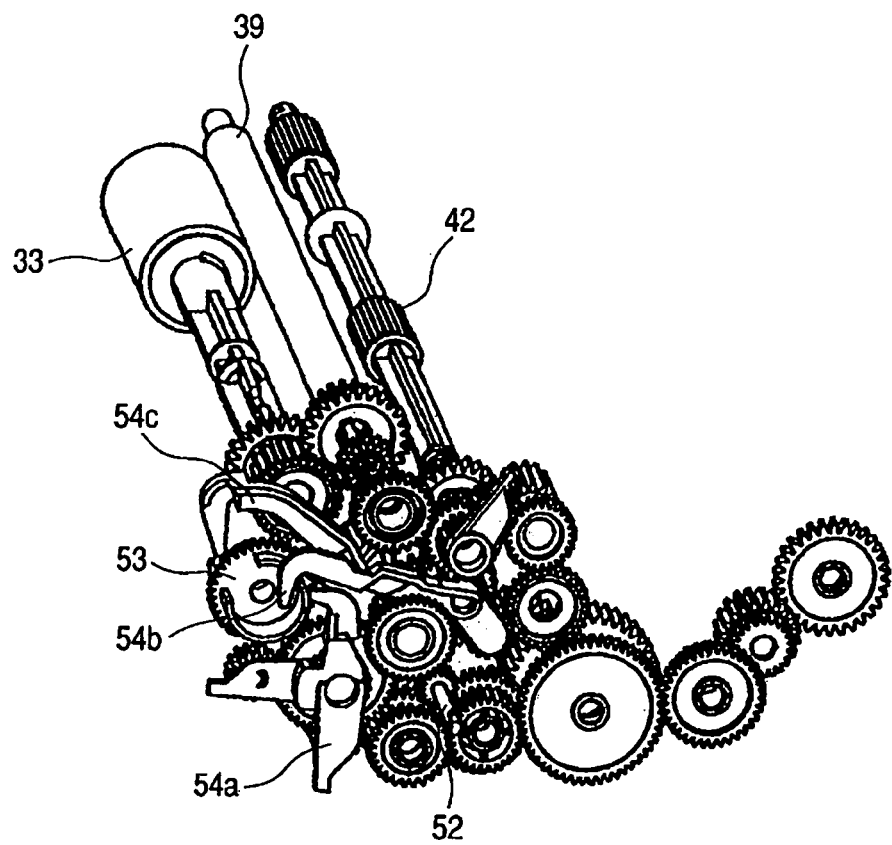
FIG. 4B is a perspective view of the driving system and rollers seen from an oblique upper position.

FIG. 4A is a side elevational view of a driving system of the facsimile apparatus of FIG. 1. FIG. 4B is a perspective view of the driving system and rollers seen from an oblique upper position. Subsequently, the driving system of the facsimile apparatus 100 will now be described with reference to FIGS. 1, 4A, and 4B. In FIGS. 4A and 4B, in the embodiment, all rollers are driven by one motor 52. Therefore, the motor 52 is rotated in the reverse direction once, which one of the rollers is driven is selected (selecting mode), and thereafter, the motor 52 is rotated in the forward direction (driving mode) in order to drive the selected roller. In the selecting mode, when the motor is rotated in the reverse direction, a gear 53 with a cylinder for controlling the switching operation is rotated. Positions of various arms 54 (54a, 54b, 54c) are restricted by the rotational position of the switching control cylinder, so that gear coupling and drive coupling suitable for the driving mode are made.

Specifically speaking, the driving mode can be switched to one of the following four modes: a state where a document separating roller 47, the CIS roller 51, and a recording paper ejecting roller 42 are driven (Mode 1); a state where a recording paper pickup roller 33 and the recording paper ejecting roller 42 are driven (Mode 2); a state where the platen roller 39 and the recording paper ejecting roller 42 are driven (Mode 3: FIG. 4); and a state where only the recording paper ejecting roller 42 is driven (Mode 4). After the driving mode is switched to one of them, by switching the rotating direction of the motor 52 to the forward direction, a driving force is transmitted to the various rollers.

Figure 3:
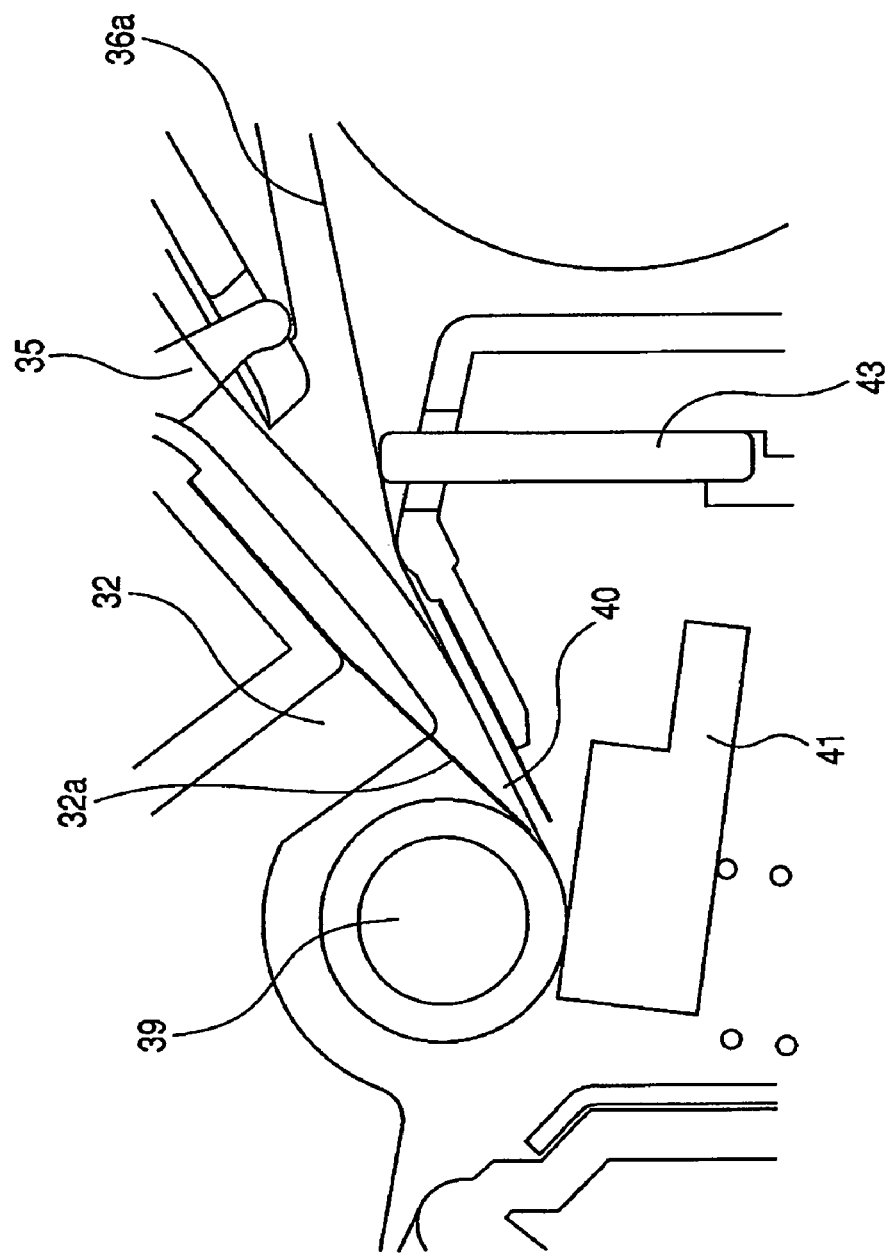
FIG. 3 is a partial vertical sectional view enlargedly showing peripheries of a recording unit of the facsimile apparatus of FIG. 1.
Figure 5:
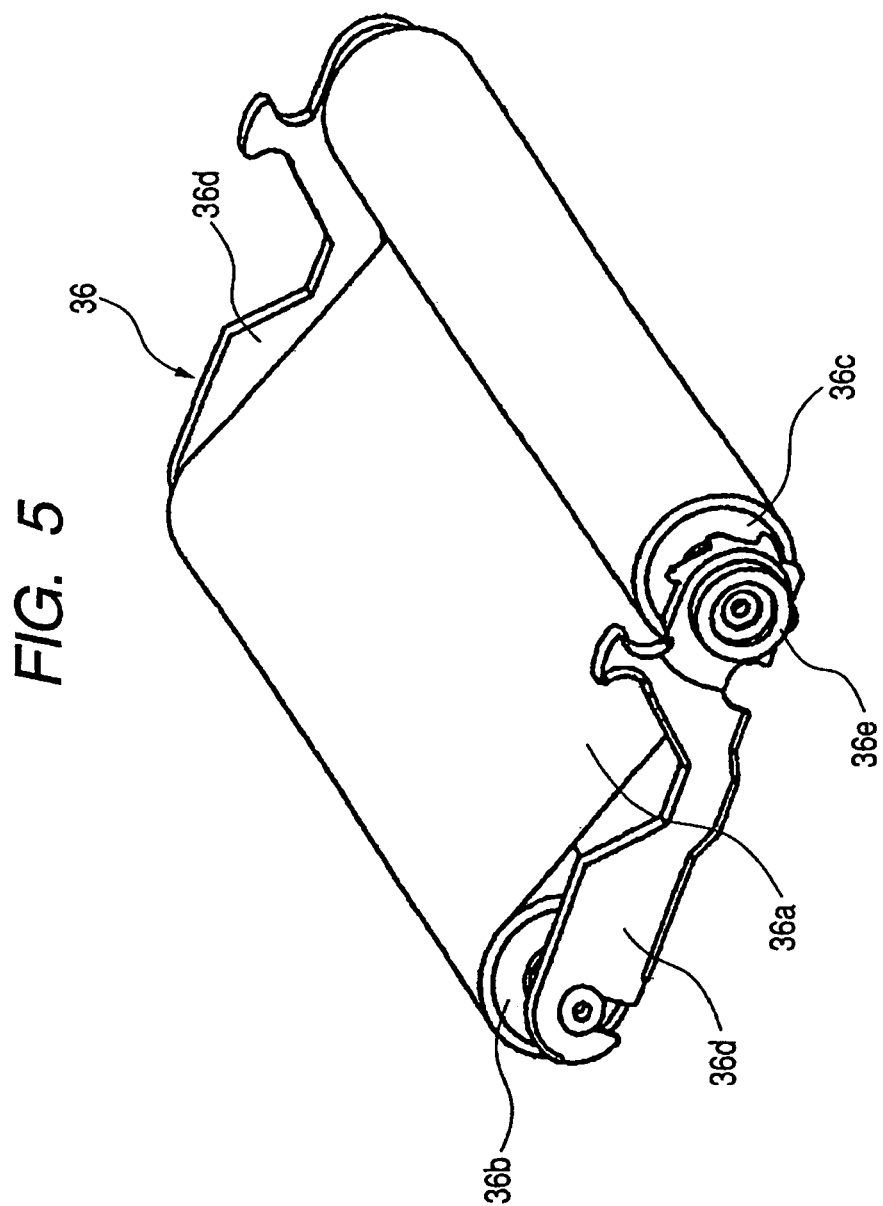
FIG. 5 is a perspective view showing an ink cartridge of the facsimile apparatus of FIG. 1.

FIG. 3 is a partial vertical sectional view enlargedly showing peripheries of the recording unit of the facsimile apparatus 100 of FIG. 1. FIG. 5 is a perspective view showing the ink cartridge 36 of the facsimile apparatus 100 of FIG. 1. A construction and the operation of the image recording unit 3 of the facsimile apparatus 100 will now be described with reference to FIGS. 1, 3, and 5. First, the construction of the image recording unit (printer unit) 3 of the facsimile apparatus 100 will be described. In FIGS. 1 and 3, the recording paper P is conveyed in the direction shown by an arrow S along a recording paper conveying path 30. A recording paper stacking tray (recording paper stacking main tray) 26 is detachably attached to the paper feed frame 32 and supports, the recording paper P set in the ASF (Auto Sheet Feeder) unit 2 so that its rear edge portion does not hang down. A recording paper cover 27 as a cover of the recording paper stacking tray 26 is also used as a tray of the documents D set in the ADF (Auto Document Feeder) unit 6. A recording paper inserting port 29 is an opening portion for inserting the recording paper P into the apparatus main body 16.

The ASF unit 2 comprises the recording paper pickup roller 33 attached to the paper feed frame 32, the recording paper ejecting roller 42, and an under guide 37. The paper feed frame 32 is constructed in such a manner that it guides the upper side of the recording paper conveying path up to the image recording unit and it guides the lower side of the recording paper conveying path after the image recording unit. The under guide 37 forms a lower guide of the recording paper conveying path. A recording pre-pressure contact arm 31 and a recording separating pad 34 regarding the separation of the recording paper P are rotatably held to the under guide 37. The recording pre-pressure contact arm 31 is rotatably held around a rotational center axis of the recording separating pad 34' as a center. A plurality of recording paper are stacked on the upper surface of the recording separating pad 34. A recording pre-pressure contact arm spring 31a is used to press and upwardly rotate the recording pre-pressure contact arm 31. The spring 31a always urges the recording pre-pressure contact arm 31 in such a direction that the arm 31 is come into contact with the recording paper pickup roller 33. A recording separating pad spring 34a is arranged between the recording separating pad 34 and the under guide 37. The spring 34a urges the recording separating pad 34 in such a direction that the pad 34 is come into contact with the recording paper pickup roller 33.

The recording paper pickup roller 33 separates and conveys a plurality of recording paper P set on the recording paper stacking tray 26 one by one. When a plurality of recording paper P are conveyed in an overlapped state by the recording paper pickup roller 33, the recording separating pad 34 acts so that the recording paper P are separated and only one sheet of recording paper P is conveyed. A PE (Paper Edge) sensor 35 detects a front edge of the recording paper P which was separated and conveyed one by one. The image recording unit 3 is provided with: an ink sheet 36a which is fed from the ink sheet cartridge 36; the line head (TPH (Thermal Print Head)) 41 having heating elements arranged at a density of eight heating elements per 1 mm in the width direction of the recording paper P; and a platen roller 39 for pressing the recording paper P and the ink sheet 36a onto the TPH 41 and conveying the recording paper P. The TPH 41 and the platen roller 39 are come into pressure contact with each other by a spring force of 3 to 4 kgf in total.

However, if the lower cover 24 made of a molding material directly receives such a spring force, there is a risk of occurrence of various inconvenience including deformation and the like. To prevent it, the lower cover 24 is reinforced by a TPH stay 41b whose width is larger than that of the TPH and which is made of a sheet metal on a seat surface of a TPH spring 41a. Further, a boss 24a extending to the sheet metal which holds the board that controls the whole apparatus is formed just under the lower cover 24 locating at almost the center in the lateral direction of the TPH 41. On the downstream of the image recording unit 3, there are arranged: a U-turn guide 38 for guiding the recording surface side of the recorded recording paper P and turning the recording paper P back; the recording paper ejecting roller 42 for ejecting the recorded recording paper P to the outside of the apparatus; a paper ejecting roller 42a which is come into pressure contact with the recording paper ejecting roller 42 by a spring (not shown) and driven by the recording paper ejecting roller; and the like.

There are side walls at both ends of the recording paper stacking tray 26. A distance between the inner sides of the walls is set to be slightly larger than a width of recording paper. Variations of right and left settings of the recording paper are restricted by the both side walls of the recording paper stacking tray 26. In FIGS. 1 and 5, in the ink sheet cartridge 36, the ink sheet 36a wound around a paper sleeve 36b on the supplying side is wound by a paper sleeve 36c on the take-up side. Since the ink sheet cartridge 36 has a construction in which the two paper sleeves 36b and 36c are held by two plate-shaped molded parts 36d, the cartridge 36 is easily detachable to/from the apparatus main body 16. Parallelism of the two paper sleeves 36b and 36c is specified when they are attached to the apparatus main body. The winding operation of the ink sheet cartridge 36 is executed by rotating a gear 36e fixed to the paper sleeve 36c on the take-up side by the motor 52 in Mode 3. A diameter of the paper sleeve 36c on the take-up side is small in the beginning and increases as the ink sheet is wound. Therefore, if the paper sleeve 36c on the take-up side is rotated at a predetermined speed, a take-up speed of the ink sheet 36a changes.

If a conveying speed of the recording paper P is not made constant, the normal image cannot be recorded when the image is formed. Therefore, the conveying speed of the recording paper P is controlled by the platen roller 39 held to the paper feed frame 32. That is, the take-up speed of the ink sheet cartridge 36 is set to be slightly higher than a conveying speed of the platen roller 39. Since a difference occurs between the take-up speed of the ink sheet by the paper sleeve 36c on the take-up side and the conveying speed of the ink sheet by the platen roller 39, a torque limiter which operates in such a manner that when a torque of a predetermined value or more is applied, gears slip and the driving force is not transferred is arranged in a gear array for driving the paper sleeve 36c on the take-up side. Owing to such a construction, while the ink sheet 36a and the recording paper P are conveyed at a predetermined speed, the ink sheet can be wound without getting loose. When the ink sheet cartridge 36 is fully used, the whole ink sheet is removed from the paper sleeve 36b on the supplying side and wound around the paper sleeve 36c on the take-up side. The presence or absence of the ink sheet 36a in this case is detected by an ink sheet sensor 43 (FIGS. 1 and 3) which is attached to the lower cover 24 and used to detect the presence or absence of the ink sheet.

The recording operation (printing operation) of the facsimile apparatus 100 according to the embodiment will now be described. In the facsimile apparatus 100 of FIG. 1, when a facsimile signal from the outside or the read signal from the reading unit 5 is sent, the motor 52 (FIGS. 4A, 4B, and 6) is activated. First, the motor 52 is rotated in the reverse direction once. After the gears are coupled in the state of Mode 2, by forwardly rotating the motor, the recording paper pickup roller 33 is rotated clockwise. Thus, the recording paper P in the upper layer portion among a plurality of recording paper P stacked on the recording pre-pressure contact arm 31 are come into contact with the recording paper pickup roller 33 and conveyed in the direction shown by the arrow S. The recording paper P in the lower layer portion are stopped by the recording separating pad 34. The recording paper P in the top portion are separated one by one and conveyed to the image recording unit 3.

The front edge of the separated one sheet of recording paper P is detected by the PE sensor 35 (FIGS. 1 and 3). After it is detected by the PE sensor 35, the paper is conveyed by a length corresponding to a predetermined number of steps by the motor 52. Thus, the front edge of the recording paper P is hit against a wedge portion 40 (FIG. 3) comprising the stopped platen roller 39, the TPH 41, and a paper feed frame sheet 32a which is adhered to the paper feed frame 32 and guides the paper. After it is hit, the motor is controlled so that a slight bending occurs in the recording paper P. Owing to such motor control, the operation (action, function) to remove a slight skew which is caused when the recording paper P is separated or when the pickup of the recording paper P is started is executed.

The motor 52 is reversely rotated in such a state and the gear coupling is changed to the state of Mode 3. At this time, since the latter half portion of the recording paper P is sandwiched between the stopped recording paper pickup roller 33 and the recording separating pad 34, a loop of the recording paper P is not eliminated. After that, the motor 52 is again rotated in the forward direction, the recording paper P is conveyed by a length of the number of steps corresponding to a predetermined blank amount of the front edge of the recording paper, and the recording operation is started. As a recording operation, each heating element of the TPH (Thermal Print Head)) 41 according to the recording image of one line in the recording paper conveying direction is allowed to generate heat for a short time, the ink of the ink sheet 36a which is sandwiched between the platen roller 39 and the TPH 41 and conveyed together with the recording paper P is melted, and the ink corresponding to the recording image is transferred to the recording paper P.

After the image of one line is recorded, the recording paper P and the ink sheet 36a are conveyed by the length of one line by the platen roller 39 and the image is recorded again. After a rear edge of the recording paper P is detected by the PE sensor 35, the above operation is repeated: the recording paper P is conveyed by the length of a predetermined number of steps. The predetermined number of steps is previously specified on the basis of a relation between the PE sensor 35 and the recording position by the TPH 41 and the blank amount of the rear edge of the image area.

In FIG. 1, the recorded recording paper P is conveyed to a rib 24b on the downstream side formed on the lower cover 24 together with the ink sheet 36a. After that, the recording paper P enters the paper feed frame 32 again and the ink sheet 36a is wound around the paper sleeve 36c on the take-up side of the ink sheet cartridge 36. To smoothly peel off the ink sheet 36a from the recording paper P, the ink sheet is wound in the opposite direction on the take-up side. That is, it is wound in such a manner that the surface of the ink sheet 36a which corresponds to the outside on the paper sleeve 36b on the supplying side is set to the inside on the paper sleeve 36c on the take-up side. The recording paper P which entered the paper feed frame 32 again is restricted by the U-turn guide 38 and ejected onto the upper surface side of the paper feed frame 32 by the paper ejecting roller 42a held to the U-turn guide 38 and the recording paper ejecting roller 42 held by the paper feed frame 32.

The conveyance is performed in the state of Mode 3 until the rear edge of the recording paper passes through the peel-off position of the recording paper P and the ink sheet 36a. This is because after the image is recorded, a time that is required until the ink sheet 36a is peeled off from the recording paper P is set to be constant, thereby keeping the image process constant. After that, by reversely rotating the motor 52, the gear coupling is changed to the state of Mode 4. Therefore, by forwardly rotating the motor 52, the recording paper P is completely ejected and stacked onto the surface of the recording paper cover 27. If there is image data of the next page, by repeating the series of operations mentioned above, the image is recorded onto the recording paper.

A construction of the reading unit 5 of the facsimile apparatus 100 according to the embodiment will now be described. In FIG. 1, the document D is conveyed in the direction shown by an arrow E along the conveying path. Therefore, first, a document feeding port cover 45 is opened, the document D is set into a document inserting port 44, and a position in the width direction of the set document D is restricted to a predetermined position by a document slider (not shown). The presence or absence of the document D is detected by a document sensor 46. The document D is conveyed one by one by the ADF unit 6. The ADF unit 6 comprises: the document separating roller 47; a document separating member 48 attached so as to be rotatable around a fulcrum 48a as a rotational center; a document separating member spring (not shown) for urging the document separating member 48 counterclockwise; and the like. The document D is constructed so that the document D is come into pressure contact with the document separating roller 47 by the document separating member 48.

On the downstream side of the document separating roller 47, there are provided: the contact image sensor (CIS) 50 for reading image information of the document D by allowing the sensor unit to be directly come into contact with the document D; and the CIS roller 51 arranged so as to face the CIS 50 in order to give a document conveying function. The CIS roller 51 is fixed to the apparatus main body side. The CIS 50 is pushed up in the direction from the apparatus main body side toward the CIS roller 51 by a compression spring (not shown). Thus, floating and fluttering of the document D are suppressed and a conveying force of the document D can be obtained.

The operation of the reading unit 5 of the facsimile apparatus 100 according to the embodiment will now be described. In FIG. 1, the user sets the document D into the document inserting port 44 of the ADF unit 6, the document sensor 46 detects the completion of the setting of the document D.

Subsequently, when the user presses a reading start button (not shown) provided for the operation unit 10, the motor 52 is activated, thereby rotating the document separating roller 47 counterclockwise. Thus, while the document D is separated by the document separating member 48 that was come into pressure contact with the document separating roller 47 which is rotated counterclockwise, only one sheet of document in the bottom layer is separated and conveyed to the reading unit 5.

The document D separated by the ADF unit 6 as mentioned above is conveyed by the document separating roller 47. The front edge of the document is detected by a document edge sensor (DE sensor) 49 arranged in a position just before the CIS roller 51. The necessary number of steps to the reading position of the CIS 50 after the front edge of the document was detected by the DE sensor 49 has previously been obtained by experiments or the like. Therefore, after the document D is conveyed by a length of a predetermined number of steps, the lower surface of the document D is sequentially read one line by one by the CIS 50. The document D which was read is ejected to the outside of the apparatus by the CIS roller 51 from a document ejecting port 57 formed in the front surface of the apparatus main body 16. If a plurality of documents D have been set, the motor 52 is rotated until the document sensor 46 detects the absence of the document, thereby allowing the CIS 50 to repeat the reading operation of the image data while the ADF unit 6 separates the documents D one by one and conveys them.

Figure 7:
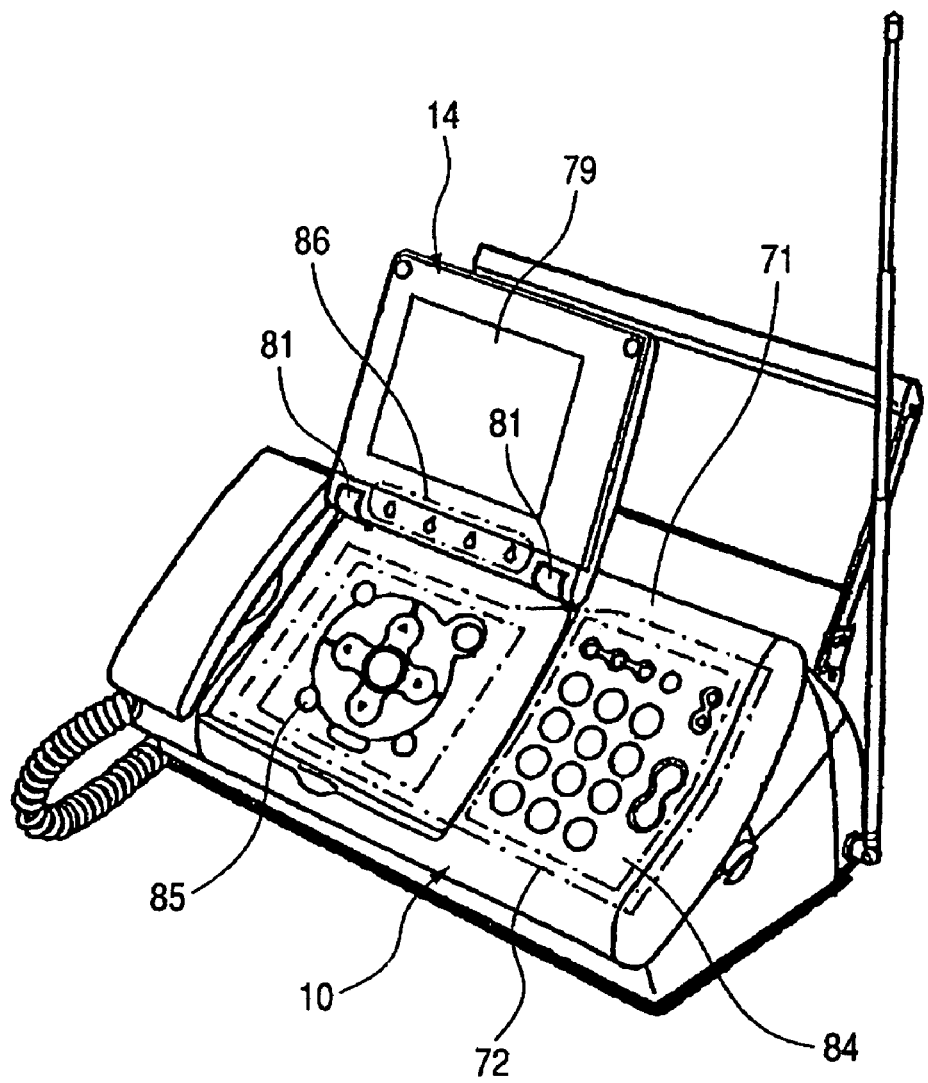
FIG. 7 is an external perspective view showing a state when a display unit is opened in the facsimile apparatus of FIG. 1.
Figure 9:
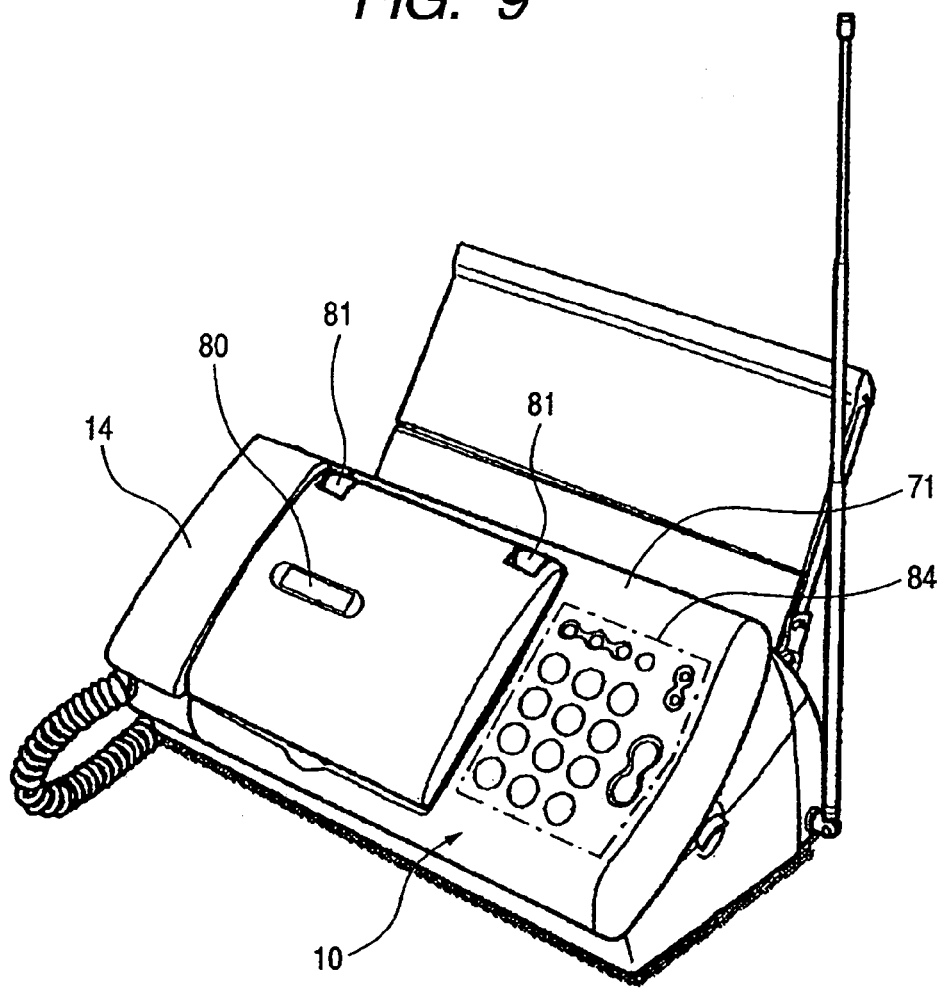
FIG. 9 is an external perspective view showing a state when the display unit is closed in the facsimile apparatus of FIG. 1.

FIG. 7 is an external perspective view showing a state when the display unit 14 is opened in the facsimile apparatus 100 of FIG. 1. FIG. 9 is an external perspective view showing a state when the display unit 14 is closed in the facsimile apparatus 100 of FIG. 1. A construction of the operation unit 10 in the facsimile apparatus 100 according to the embodiment will now be described. In FIG. 7, the operation unit 10 is constructed by an operation panel 71 and the display unit 14 and a plurality of operation buttons are arranged on the operation panel 71. The plurality of operation buttons are provided to execute an input of a telephone number, facsimile transmission and reception, and further, other functions. The display unit 14 is provided to display time in a standby mode, outgoing/incoming call telephone numbers, an operating mode of the apparatus, registration contents, and the like to the user and display E-mail messages, Web browsing information, or the like by the operation of the user.

Figure 8:
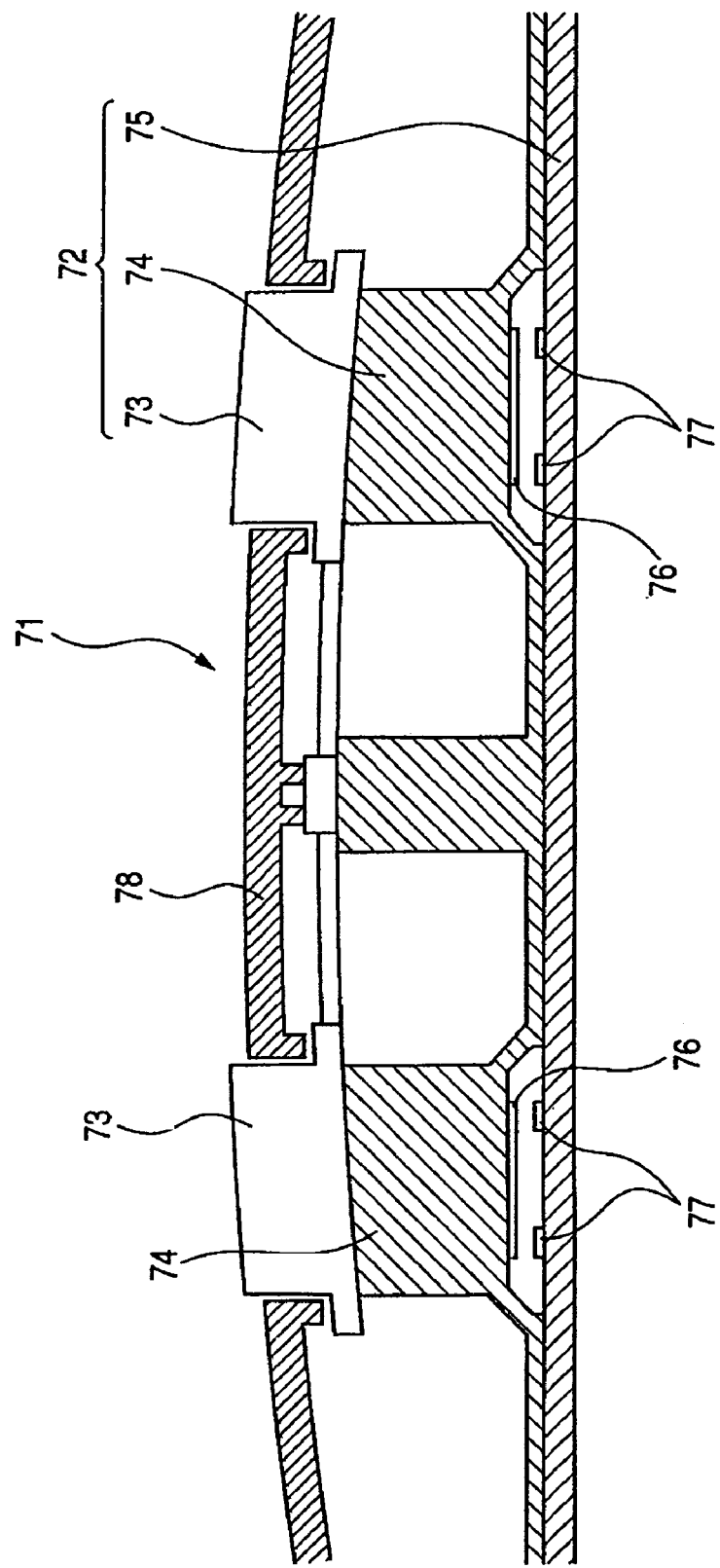
FIG. 8 is a vertical sectional view of an operation panel of the facsimile apparatus of FIG. 1.

FIG. 8 is a vertical sectional view showing an internal construction of the operation panel 71. In FIG. 8, the operation button is constructed by a key-top 73, a rubber key 74, and an operation board 75. The rubber key 74 has a function as a switch and a function of giving an operation feeling (clicking force) of the button. A carbon pattern 77 for switching ON/OFF of the key in a contact/contactless state in correspondence to carbon 76 printed on the back surface of the rubber key 74 is printed on the operation board 75. Reference numeral 78 denotes an operation panel box member as an external covering member of the operation panel 71.

As shown in FIG. 7, the display unit 14 is rotatably and axially supported to the operation panel 71. The display unit 14 has a rotatable range of about 160° to the operation panel 71. When the display unit 14 is closed, as shown in FIG. 9, the display unit 14 is arranged so as to overlap the operation panel 71. When the display unit 14 is open, as shown in FIG. 7, a main LCD 79 arranged in the display unit 14 is exposed to the user, thereby enabling the user to recognize information displayed on the main LCD 79. When the display unit 14 is closed, as shown in FIG. 9, the main LCD 79 is hidden from the user and a sub-LCD 80 arranged in the display unit 14 is exposed to the user, thereby enabling the user to recognize information displayed on the sub-LCD 80. When the display unit 14 is open, the sub-LCD 80 is hidden from the user.

An electrical installing layout of the whole facsimile apparatus 100 according to the embodiment will now be described. FIG. 2 is a perspective view of the facsimile apparatus 100 seen from the front side. The left side of the diagram is set to the left side of the facsimile apparatus 100. A bottom plate 23 shown in FIG. 2 is a metal plate. The following component elements are attached to the bottom plate 23: the sub-control board 19 on which a circuit for controlling the motor 52 and various sensors and an NCU circuit are mounted; the board 18 for the cordless handset on which a radio unit is mounted; and the power source board 17 for supplying power sources to each device and each board.

A handset modular terminal attached to the sub-control board 19 is fitted into a hole (not shown) formed in the left side surface of the apparatus. The sub-control board 19 is arranged at a left edge of the bottom plate 23 so that the handset modular terminal is arranged on the side of the bottom plate 23. The cordless handset board 18 is arranged on the right side of the bottom plate 23 so that it can be easily connected to an antenna 60 arranged on the rear right side of the apparatus. The power source board 17 is arranged in a rear portion of the bottom plate 23 in order to lead a power cable 61 from the rear side of the apparatus to the outside thereof. The antenna 60 shown in FIG. 2 is fixed to the cordless handset board 18 through an antenna holder 62 so as to be insulated from the bottom plate 23.

The operation panel 71 and the display unit 14 mentioned above will be further specifically explained. First, the rotational center position of the display unit 14 will be explained. In FIG. 7, the display unit 14 is attached to the operation panel 71 so as to be rotatable around rotational center portions 81 as a fulcrum. The rotational center portions 81 are arranged in the rear portion of the operation panel 71. As shown in FIG. 7, when the display unit 14 is open, it is arranged in the upper rear portion of the operation panel 71. Thus, all buttons arranged in the whole area of the operation panel 71 can be operated. Therefore, although the operation panel has a number of buttons, a degree of freedom upon designing can be assured in terms of a size of button and a layout of the buttons and the button layout having an excellent appearance and excellent operability can be realized.

Figure 11:
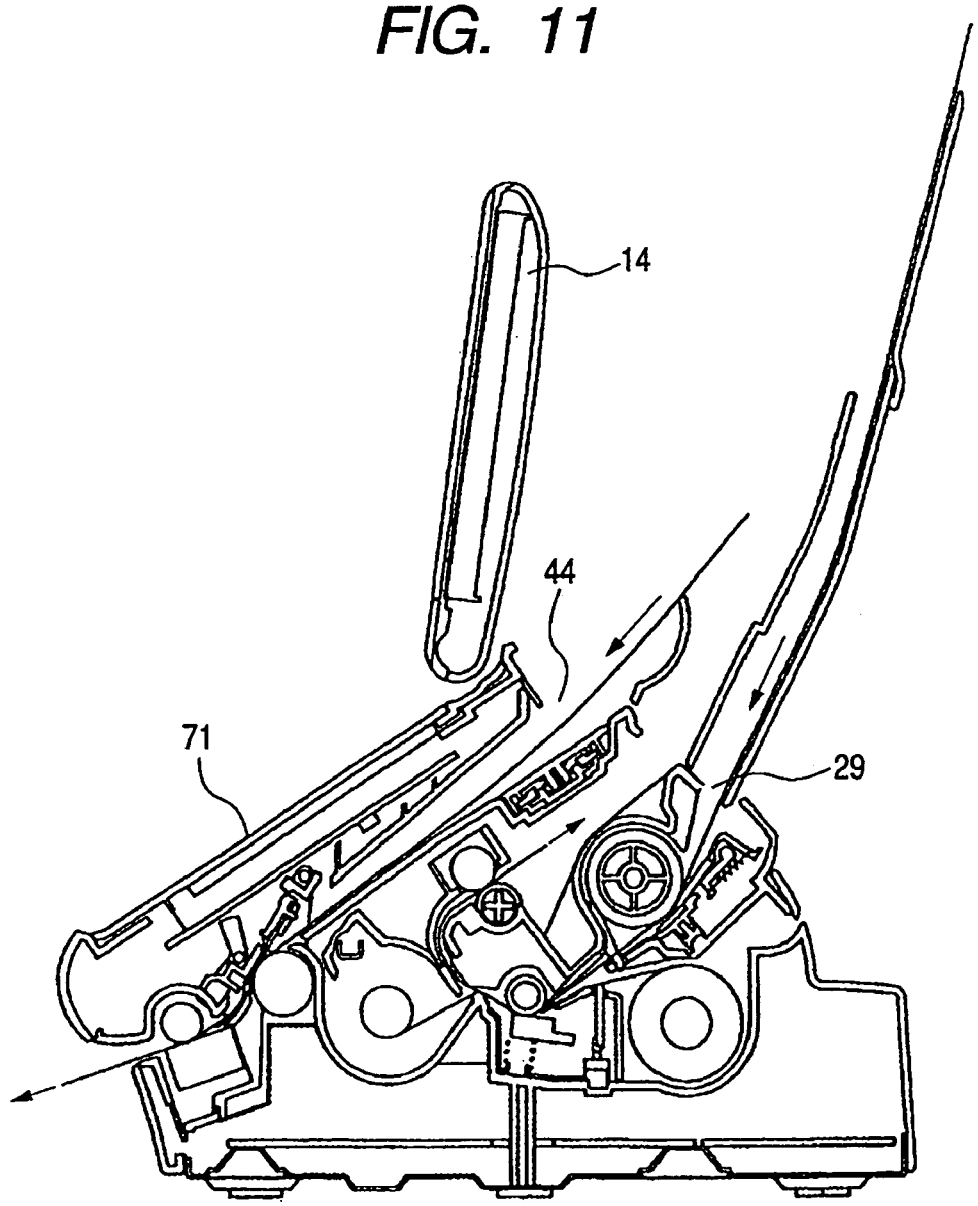
FIG. 11 is a vertical sectional view of the center portion showing a state when the display unit is opened in the facsimile apparatus of FIG. 1.
Figure 12:
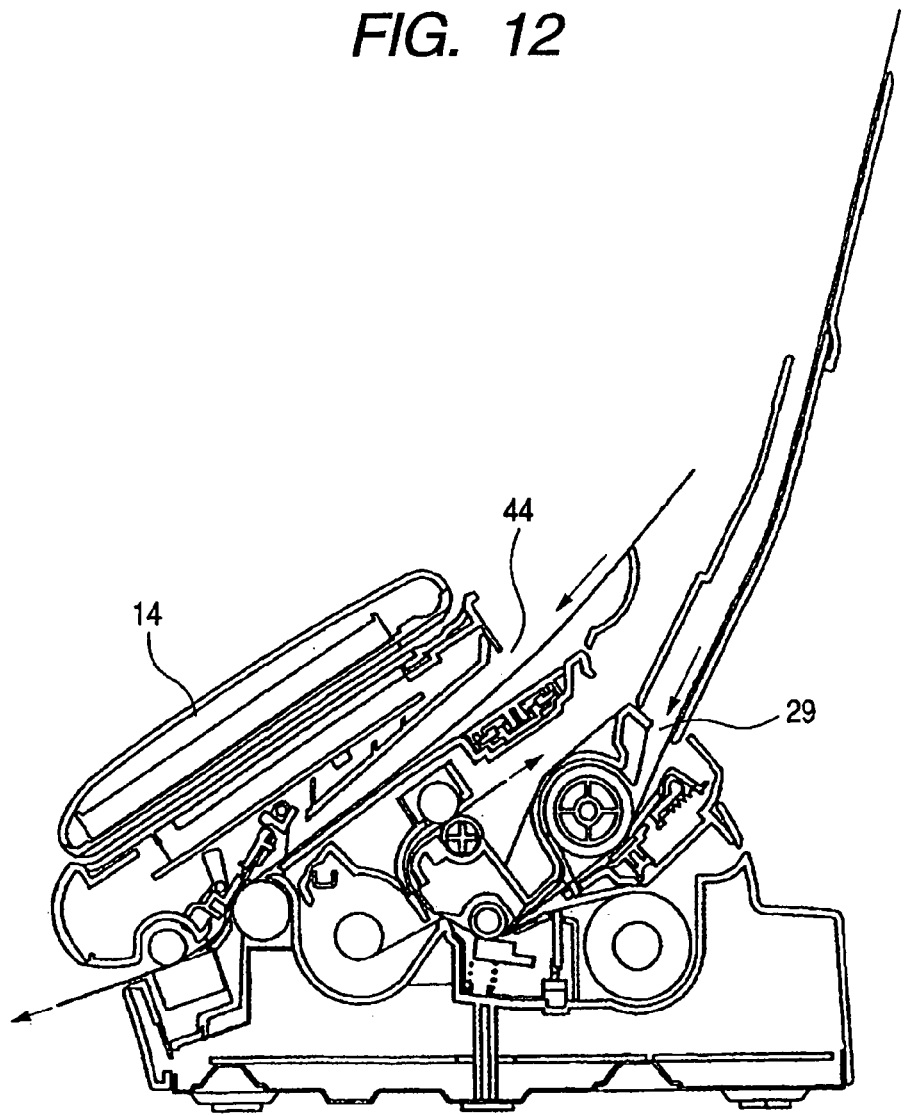
FIG. 12 is a vertical sectional view of the center portion showing a state when the display unit is closed in the facsimile apparatus of FIG. 1.

FIG. 11 is a vertical sectional view of the center portion showing a state when the display unit 14 is opened in the facsimile apparatus 100 of FIG. 1. FIG. 12 is a vertical sectional view of the center portion showing a state when the display unit 14 is closed in the facsimile apparatus 100 of FIG. 1. A positional relation among the display unit 14, the document inserting port 44, and the recording paper inserting port 29 will now be described with reference to FIGS. 11 and 12. As shown in FIG. 11, the document inserting port 44 and the recording paper inserting port 29 are located on the rear side of the operation panel 71. That is, the document inserting port 44 and the recording paper inserting port 29 are arranged behind the display unit 14 in the open state. Therefore, the document inserting port 44 and the recording paper inserting port 29 have a construction in which they become the shade of the display unit 14, it is difficult for the user to see, and when he inserts the documents or the recording paper into the apparatus main body, it is difficult to insert them. In the embodiment, by closing the display unit 14 as shown in FIG. 12, the user can easily observe the document inserting port 44 and the recording paper inserting port 29 and also easily access them. Consequently, when the user inserts the document D or the recording paper P, he can insert them under the stable and high operability. Also in the case where the user takes the stacked document D or recording paper P as necessary, he can do the work under the high operability.

As mentioned above, by rotatably and axially supporting the display unit 14 to the operation panel 71 and arranging the rotational center portions 81 to the rear portion of the operation panel 71, the compactness of the whole apparatus is realized. At the same time, when the display unit 14 is opened, the sufficient area for the button layout is assured and the high degree of freedom upon designing is assured, so that the button layout having the excellent appearance and excellent operability can be easily realized. Further, by closing the display unit 14, the user can easily insert the document D or the recording paper P under the stable and high operability.

A construction when the display unit 14 is closed will now be described. As shown in FIGS. 9 and 12, when the display unit 14 is closed, the main LCD 79 as a first display apparatus provided on the first surface (obverse surface) of the display unit 14 is hidden from the user, and the sub-LCD 80 as a second display apparatus provided on the second surface (reverse surface) of the display unit 14 is exposed to the user. Detecting means (display unit opening/closure sensor) for detecting the opening/closure of the display unit 14 is provided in a position near the rotational center portions 81. Therefore, the apparatus main body is constructed in such a manner that the fact that the display unit 14 is in the closing state is recognized from the display unit opening/closure sensor (not shown) arranged in the position near the rotational center portions 81 and, on the basis of the recognition result, the main LCD 79 is lit off (non-display mode) and the sub-LCD 80 is lit on (display mode). In the embodiment, the apparatus main body is constructed in such a manner that when the display unit 14 is opened, the first display apparatus 79 is lit on (display mode) and the second display apparatus 80 is lit off (non-display mode), and when the display unit 14 is closed, the first display apparatus 79 is lit off (non-display mode) and the second display apparatus 80 is lit on (display mode). That is, the opening/closure of the display unit 14 is detected by the display unit opening/closure sensor (not shown) and the display apparatus (the main LCD 79 or the sub-LCD 80) hidden from the user as mentioned above is lit off (non-display mode), thereby realizing power saving.

As shown in FIG. 9, when the display unit 14 is closed, a partial button group (second button group 85) among a plurality of buttons on the operation panel 71 is hidden by the display unit 14 and only a residual button group (first button group 84) is exposed and can be operated by the user. As a first button group 84 which is exposed when the display unit 14 is closed, there are buttons regarding the telephone operation such as numeral buttons which are used when the user pushes a telephone number, redial button, hold-on button, and the like. Further, buttons regarding the auto answer-phone such as button for setting and resetting the auto-answering recording function, reproducing key for reproducing messages recorded in the auto answer-phone, and the like are also included in the first button group 84. The sub-LCD 80 is constructed so as to display an outgoing call telephone number, an incoming call telephone number, time in a standby mode, and the like. In the operation of the outgoing/incoming call of the telephone and the auto answer-phone and, further, the simple operation such as FAX reception or the like as mentioned above, those operations can be executed in the closing state of the display unit 14. The operation which can be easily executed and the high operability owing to the simple button layout are realized.

The construction when the display unit 14 is open will now be described. As shown in FIGS. 7 and 11, when the display unit 14 is opened, the main LCD 79 is exposed to the user and the sub-LCD 80 as a second display apparatus is hidden from the user. The apparatus main body recognizes the fact that the display unit 14 is in the opening state from the display unit opening/closure sensor (not shown) arranged in the position near the rotational center portions 81. The apparatus main body lights on the main LCD 79 (display mode) and lights off the sub-LCD 80 (non-display mode). As shown in FIG. 7, when the display unit 14 is opened, all operation buttons 72 on the operation panel 71 are exposed, thereby providing a state where the user can operate all of the buttons. As a second button group 85 which is hidden when the display unit 14 is closed, there are buttons which are used when a telephone number is registered into a telephone directory, when E-mail is formed and transmitted/received, and when other various settings are registered. The main LCD 79 can display various contents registered by the registering operation of the user, E-mail messages, Web browsing, received image information, and the like.

In the multifunctional complicated operation such as various registrations, creation of the E-mail, display of the Web browsing information and the image information, and the like as mentioned above, the user can operate by opening the display unit 14. The facsimile apparatus having the excellent operability as a multifunctional information terminal can be constructed by using the button group arranged in the sufficient large area. At the same time, by lighting off (non-display mode) the sub-LCD 80 hidden from the user on the basis of the detection result of the display unit opening/closure sensor, the power saving can be realized. In the embodiment, the first button group 84 is mainly the buttons regarding the operation for the contents displayed onto the first display apparatus (main LCD) 79. The second button group 85 is the buttons regarding the operation by which the user can operate the apparatus main body only by displaying onto the second display apparatus (sub-LCD) 80 without displaying onto the first display apparatus 79.

LCD operation buttons 86 as a third button group arranged in the display unit 14 will now be described. As shown in FIG. 7, a plurality of LCD operation buttons 86 are arranged in an area (lower position) out of the area of the main LCD 79 of the display unit 14. The buttons on the operation panel 71 are constructed so as to allow the user to recognize button functions by a print display or the like to a periphery of the buttons. However, with respect to the LCD operation buttons 86, there is not a peripheral print display regarding the button functions but the button function corresponding to each LCD operation button 86 is displayed in the lower portion of the main LCD 79. Therefore, when the display of the lower portion of the main LCD 79 is shifted, the function of the corresponding LCD operation button 86 is also shifted. That is, the user is notified of the LCD operation button 86 by the display to the first display apparatus 79 and the function is shifted by the change in contents displayed to the first display apparatus 79. Since the LCD operation buttons 86 are arranged in positions near the lower portion of the main LCD 79 of the display unit 14, the user can easily recognize a correlation between the display contents in the lower portion of the main LCD 79 and the corresponding LCD operation button 86.

Figure 13:
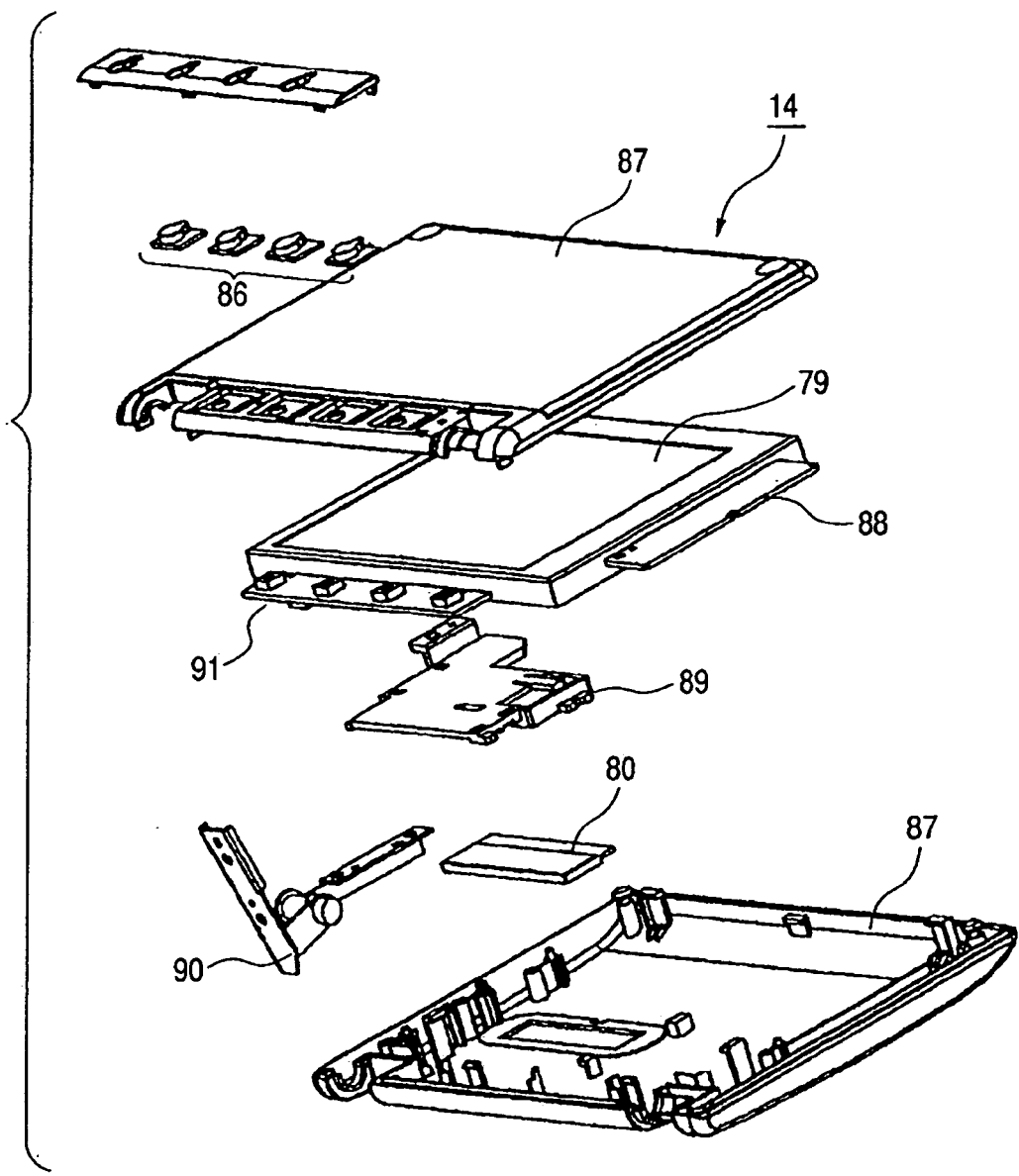
FIG. 13 is an exploded perspective view showing an internal construction of the display unit of the facsimile apparatus of FIG. 1.
Figure 14:
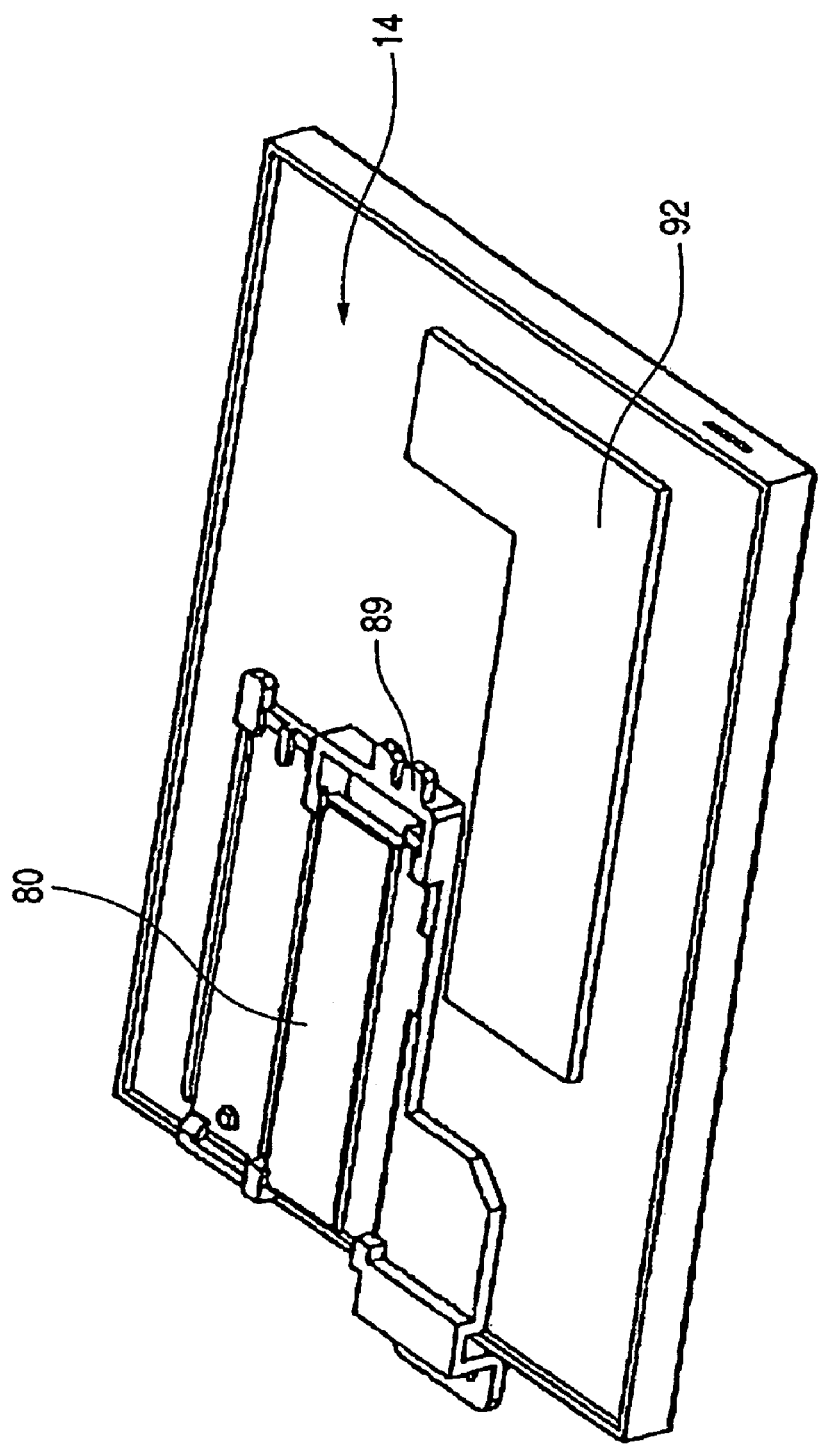
FIG. 14 is a perspective view of the display unit of the facsimile apparatus of FIG. 1 seen from the back surface direction of a main LCD.
Figure 15:
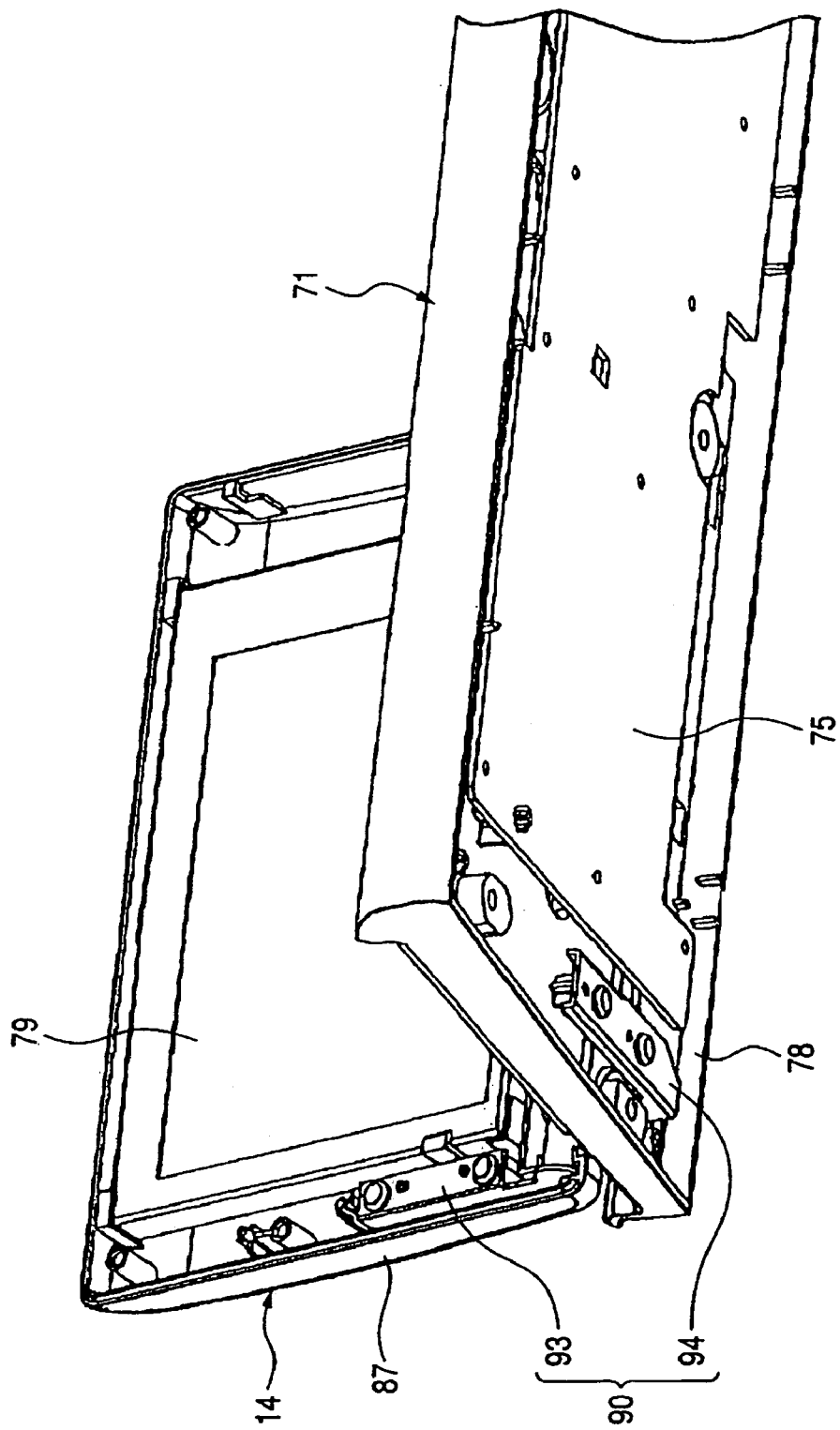
FIG. 15 is a perspective view of a construction of a hinge member of the display unit of the facsimile apparatus of FIG. 1 seen from the lower side of an operation panel 71.
Figure 16:
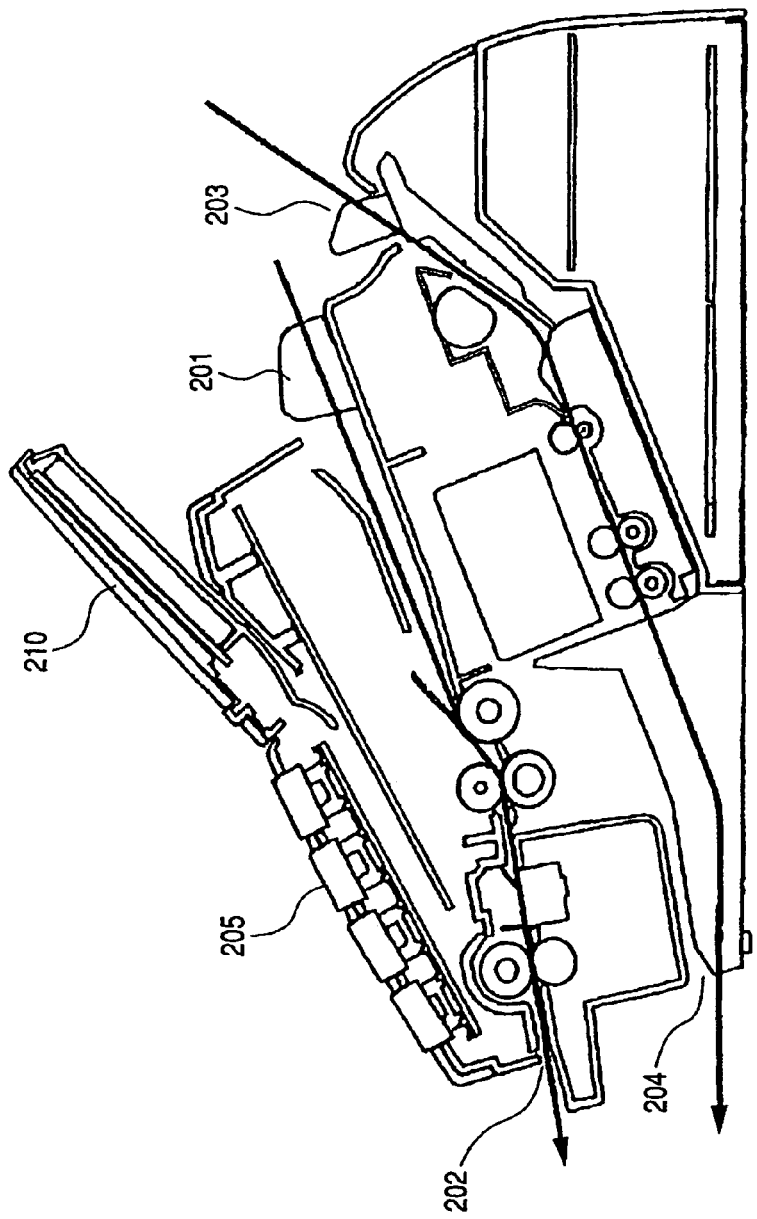
FIG. 16 is a vertical sectional view of a center portion of a conventional facsimile apparatus.
Figure 17:
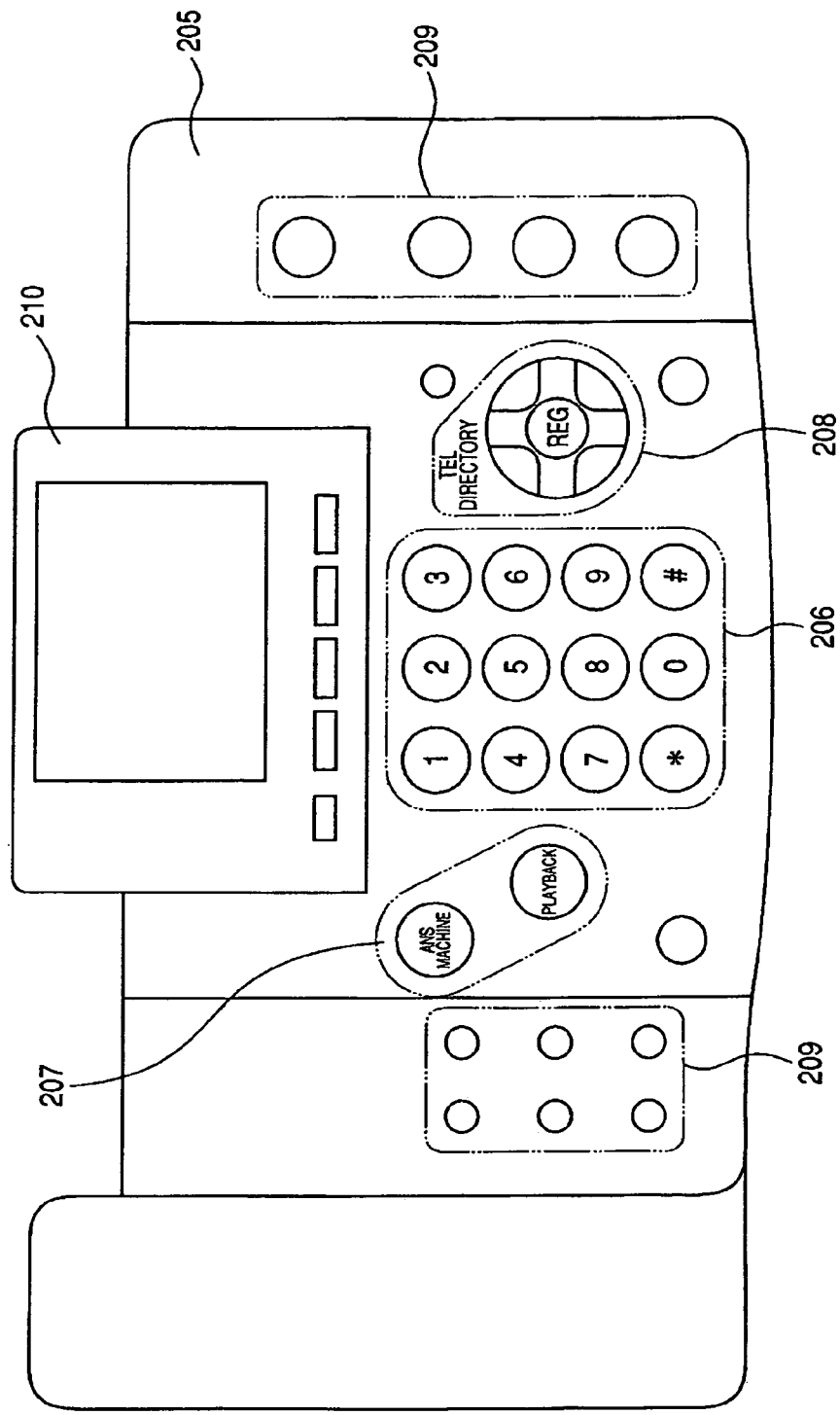
FIG. 17 is a plan view of an operation unit of the conventional facsimile apparatus.

FIG. 13 is an exploded perspective view showing an internal construction of the display unit 14 of the facsimile apparatus 100 of FIG. 1. FIG. 14 is a perspective view of the display unit 14 of the facsimile apparatus 100 of FIG. 1 seen from the back surface direction of the main LCD 79. FIG. 15 is a perspective view of a construction of a hinge member 90 of the display unit 14 of the facsimile apparatus 100 of FIG. 1 seen from the lower side of the operation panel 71. The construction of the display unit 14 will now be described with reference to FIGS. 7, 13, 14, and 15. As shown in FIG. 13, the display unit 14 comprises: a display unit box member 87; the main LCD 79; the sub-LCD 80; a light source light-on circuit board 88; a sub-LCD holder 89 for holding the sub-LCD 80; the hinge member 90 for rotatably coupling the display unit 14; the LCD operation buttons 86; and an LCD operation button board 91.

The light source light-on circuit board 88 is a circuit for converting a DC voltage into an AC high voltage. A fluorescent lamp (not shown) arranged in the main LCD 79 is lit on by the AC high voltage converted by the light source light-on circuit board 88. Since the fluorescent lamp is lit on, the user can observe the contents displayed on the main LCD 79. Since the light source light-on circuit board 88 is arranged in a side portion of the main LCD 79, its dimension in the thickness direction of the display unit 14 can be reduced. As shown in FIG. 14, the sub-LCD 80 and the sub-LCD holder 89 are arranged on the back surface (reverse surface opposite to the display surface) of the main LCD 79, that is, in the area where a main LCD board 92 attached to the back surface of the main LCD 79 does not exist. Therefore, as compared with the case where they are arranged in the area where the main LCD board 92 exists, the dimension in the thickness direction of the whole display unit 14 can be reduced by an amount corresponding to a thickness of main LCD board 92. As shown in FIG. 7, by arranging the LCD operation buttons 86 to a position between the two rotational center portions 81 in the right and left positions, space use efficiency is improved and miniaturization of the display unit 14 can be realized.

As shown in FIG. 15, the hinge member 90 for rotatably and axially supporting the display unit 14 to the operation panel 71 is arranged in the lower left portion of the display unit 14 and constructed in such a manner that it forms a spindle at the time when the display unit 14 is rotated to the operation panel 71 and a proper resistance force is generated in the rotating operation. By this proper resistance force, the user can arbitrarily vary an opening angle of the display unit 14 and hold the display unit 14 to such an angle position. Thus, an angle of the display unit can be properly adjusted for the position of the user's eyes to the facsimile apparatus main body and the operability can be more improved. As shown in FIG. 15, the hinge member 90 is attached to the display unit box member 87 in such a manner that one end portion 93 is fixed to a left side portion of the display unit box member 87 and the other end portion 94 is fixed to a left side portion of the operation panel box member 78. As shown in FIG. 15, since the other end portion 94 of the hinge member 90 is arranged on the left side of the operation board 75 of the operation panel 71, an adverse influence is not exercised on wirings of the operation board 75 and a degree of freedom of the wirings can be improved.

According to the facsimile apparatus of the embodiment described above, the apparatus comprises: the operation panel 71 arranged in the upper front portion of the apparatus main body; the display unit 14 which is closably arranged to the operation panel 71, located in the upper rear position of the operation panel 71 upon opening, and overlaid onto the operation panel upon closing; and the document inserting port 44 and the recording paper inserting port 29 arranged behind the display unit 14 upon opening in the upper portion of the apparatus main body. Therefore, the facsimile apparatus in which the large display apparatus can be mounted while realizing the miniaturization of the apparatus main body, the operation panel having the excellent operability is realized, and the excellent inserting performance of the documents and recording paper can be assured is provided. Since the display unit 14 is rotatable around the rotational center portions 81, as a fulcrum, arranged in the rear portion of the operation panel 71, it is opened and closed to the operation panel 71, so that the display unit can be opened and closed by the simple structure. By providing the proper rotational resistance to the rotational center portions 81, the opening angle of the display unit 14 can be freely varied, so that the operability of the display unit 14 can be more improved. Further, when the display unit 14 is opened, the first display apparatus 79 is exposed to the user and the second display apparatus 80 is hidden from the user. When the display unit 14 is closed, the first display apparatus 79 is hidden from the user and the second display apparatus 80 is exposed to the user. Therefore, the simple operation can be easily executed by the minimum necessary buttons and the display apparatus, while the multifunctional operation can be executed by many buttons and the display apparatus which can display a large amount of information. Consequently, both the operability of the simple operation and the operability of the multifunctional operation can be improved.

According to the facsimile apparatus of the embodiment described above, when the display unit 14 is closed, the second button group 85 is hidden from the user and the first button group 84 is exposed to the user, and when the display unit 14 is opened, all of the buttons are exposed to the user. Therefore, the simple operation can be easily executed by the least necessary buttons and the display apparatus, while the multifunctional operation can be executed by many buttons and the display apparatus which can display a large amount of information. Consequently, both the operability of the simple operation and the operability of the multifunctional operation can be improved. The second button group 85 is mainly the buttons regarding the operation of the display contents to the first display apparatus 79 and the first button group 84 is the buttons regarding the operation in which the user can operate the apparatus main body only by displaying onto the second display apparatus without displaying onto the first display apparatus. Therefore, the simple operation can be easily executed by the least necessary buttons and the display apparatus, while the multifunctional operation can be executed by many buttons and the display apparatus which can display a large amount of information. Consequently, both the operability of the simple operation and the operability of the multifunctional operation can be improved.

The third button group 86 is arranged in the area out of the first display apparatus 79 of the display unit 14. The user is notified of the button functions of the third button group 86 by the display to the first display apparatus 79. The button functions of the third button group 86 are shifted due to the change in contents displayed to the first display apparatus 79. Therefore, the operability of the multifunctional operation can be more improved. Further, the detecting means for detecting the opening/closure of the display unit 14 is provided. When the display unit 14 is opened, the first display apparatus 79 is lit on (display mode) and the second display apparatus 80 is lit off (non-display mode). When the display unit 14 is closed, the first display apparatus 79 is lit off (non-display mode) and the second display apparatus 80 is lit on (display mode). Thus, the power saving can be realized.

According to the embodiments of the invention, while the miniaturization of the apparatus main body is realized, the compatibility between the multifunctional button layout and the inserting performance of the documents and the recording paper can be realized even in the facsimile apparatus having the large display unit. By exposing only the necessary buttons in the case of the simple operation and exposing the multifunctional buttons in the case of the complicated operation, the compatibility between the simple operability and the multifunctional operability can be realized.

This application claims priority from Japanese Patent Application No. 2003-359599 filed Oct. 20, 2003, which is hereby incorporated by reference herein.

The invention claimed is:

1. A facsimile apparatus comprising:
    an operation panel arranged in an upper front position of an apparatus main body; and
    a display unit arranged in an upper portion of the apparatus main body, closably arranged relative to said operation panel, located in an upper rear position of said of said operation panel upon opening, and overlaid onto said operation panel upon closing,
    wherein said display unit comprises a first display apparatus arranged on a first surface and a second display apparatus arranged on a second surface opposite the first surface, wherein
        when said display unit is opened, said first display apparatus is exposed and said second display apparatus is hidden from a user, and
        when said display unit is closed, said first display apparatus is hidden and said second display apparatus is exposed to the user,
    wherein said operational unit comprises a first button group and a second button group, wherein
        when said display unit is closed, said first button group is hidden and said second button group is exposed to the user, and
        when said display unit is opened, both of said first button group and said second button group are exposed to the user, and
    wherein
        said first button group comprises buttons regarding operation for contents which are displayed to said first display apparatus, and
        said second button group comprises buttons regarding operation for contents which are displayed only to said second display apparatus without being displayed to said first display apparatus.

2. An apparatus according to claim 1, further comprising:
    a document inserting port arranged in the upper portion of the apparatus main body, for inserting an original document from a location to the rear of said display unit;
    a document ejecting port arranged in a front portion of the apparatus main body for ejecting the original document; and
    a recording paper inserting port arranged in the upper portion of the apparatus main body, for inserting a blank recording sheet from a location to the rear of said display unit,
    wherein said display unit does not block any of said document inserting port, said document ejecting port or said recording paper inserting port when said display unit is closed, and
    wherein said operation panel is disposed between said display unit and said document ejecting port.

3. An apparatus according to claim 1, wherein said display unit is rotated around a rotational center portion as a fulcrum provided for a rear portion of said operational panel, so that it is opened or closed to said operation panel.

4. An apparatus according to claim 1, wherein an opening angle of said display unit is variable.

5. An apparatus according to claim 1, wherein
    a third button group is arranged in an area of the first surface out of an area of said first display apparatus,
    the user is notified of functions of said third button group by displaying onto said first display apparatus, and
    the functions of said third button group are changed due to a change in contents displayed to said first display apparatus.

6. An apparatus according to claim 1, further comprising detecting means for detecting opening/closure of said display unit, wherein
    when said display unit is opened, said first display apparatus is set to a display mode and said second display apparatus is set to a non-display mode, and when said display unit is closed, said first display apparatus is set to the non-display mode and second display apparatus is set to the display mode.

7. An apparatus according to claim 1, wherein said second button group includes buttons regarding telephone operation.

8. An apparatus according to claim 7, wherein said second button group includes numeral buttons which are used when the user enters a telephone number.

* * * * *